US012431144B2

(12) United States Patent
Wang et al.

(10) Patent No.: US 12,431,144 B2
(45) Date of Patent: Sep. 30, 2025

(54) MULTI-CHANNEL AUDIO SIGNAL ENCODING AND DECODING METHOD AND APPARATUS

(71) Applicant: HUAWEI TECHNOLOGIES CO., LTD., Shenzhen (CN)

(72) Inventors: Zhi Wang, Beijing (CN); Jiance Ding, Beijing (CN); Bin Wang, Shenzhen (CN); Zhe Wang, Beijing (CN)

(73) Assignee: Huawei Technologies Co., Ltd, Shenzhen (CN)

( * ) Notice: Subject to any disclaimer, the term of this patent is extended or adjusted under 35 U.S.C. 154(b) by 335 days.

(21) Appl. No.: 18/154,633

(22) Filed: Jan. 13, 2023

(65) Prior Publication Data

US 2023/0145725 A1 May 11, 2023

Related U.S. Application Data

(63) Continuation of application No. PCT/CN2021/106514, filed on Jul. 15, 2021.

(30) Foreign Application Priority Data

Jul. 17, 2020 (CN) ......................... 202010699711.8

(51) Int. Cl.
*G10L 19/008* (2013.01)
*G10L 25/21* (2013.01)

(52) U.S. Cl.
CPC ............ *G10L 19/008* (2013.01); *G10L 25/21* (2013.01)

(58) Field of Classification Search
CPC ..... G10L 19/008; G10L 25/21; G10L 19/167; G10L 19/02; G10L 19/0212
See application file for complete search history.

(56) References Cited

U.S. PATENT DOCUMENTS

2003/0235317 A1* 12/2003 Baumgarte ............. H04S 5/005 704/E15.04
2010/0198589 A1 8/2010 Ishikawa et al.
2011/0282674 A1* 11/2011 Ojanpera .............. G10L 19/008 704/500
2019/0287542 A1* 9/2019 Fueg ................... G10L 19/0204
2021/0104249 A1* 4/2021 Fotopoulou ............. G06F 3/162

FOREIGN PATENT DOCUMENTS

CN 1765072 A 4/2006
CN 109074810 A 12/2018
WO 2018234624 A1 12/2018
WO 2020007719 A1 1/2020

* cited by examiner

*Primary Examiner* — Yogeshkumar Patel
(74) *Attorney, Agent, or Firm* — Leydig, Voit & Mayer, Ltd.

(57) ABSTRACT

Multi-channel audio signal encoding and decoding methods and apparatuses (1100, 1300) are provided. This can reduce a quantity of bits of multi-channel side information, so that saved bits can be allocated to another functional module of an encoder, to improve quality of a reconstructed audio signal of a decoder side and improve coding quality.

20 Claims, 11 Drawing Sheets

MULTI-CHANNEL AUDIO SIGNAL ENCODING AND DECODING METHOD AND APPARATUS

CROSS-REFERENCE TO RELATED APPLICATIONS

This application is a continuation of International Application No. PCT/CN2021/106514, filed on Jul. 15, 2021, which claims priority to Chinese Patent Application No. 202010699711.8, filed on Jul. 17, 2020. The disclosures of the aforementioned applications are hereby incorporated by reference in their entireties.

TECHNICAL FIELD

This application relates to audio coding technologies, and in particular, to multi-channel audio signal encoding and decoding methods and apparatuses.

BACKGROUND

With continuous development of multimedia technologies, audio has been widely used in the fields such as multimedia communication, consumer electronics, virtual reality, and human-computer interaction. Audio coding is one of key technologies of the multimedia technologies. In audio coding, redundant information in a raw audio signal is removed to reduce a data amount, so as to facilitate storage or transmission.

Multi-channel audio coding is coding of at least two channels, including common 5.1 channels, 7.1 channels, 7.1.4 channels, 22.2 channels, and the like. Multi-channel signal screening, coupling, stereo processing, multi-channel side information generation, quantization processing, entropy encoding processing, and bitstream multiplexing are performed on a multi-channel raw audio signal to form a serial bitstream, so as to facilitate transmission in a channel or storage in a digital medium.

How to reduce encoding bits of multi-channel side information to improve quality of a reconstructed signal on a decoder side becomes an urgent technical problem to be resolved.

SUMMARY

This application provides multi-channel audio signal encoding and decoding methods and apparatuses, to improve quality of a coded audio signal.

According to a first aspect, an embodiment of this application provides a multi-channel audio signal encoding method. The method may include: obtaining audio signals of P channels in a current frame of a multi-channel audio signal, where P is a positive integer greater than 1, the P channels include K channel pairs, each channel pair includes two channels, K is a positive integer, and P is greater than or equal to K×2; obtaining respective energy/amplitudes of the audio signals of the P channels; generating equalization side information of the K channel pairs based on the respective energy/amplitudes of the audio signals of the P channels; and encoding the equalization side information of the K channel pairs and the audio signals of the P channels to obtain an encoded bitstream.

In this implementation, the equalization side information of the channel pairs is generated, and the encoded bitstream carries the equalization side information of the K channel pairs without carrying equalization side information of an uncoupled channel. This can reduce a quantity of bits of energy/amplitude equalization side information in the encoded bitstream and a quantity of bits of multi-channel side information. In addition, saved bits can be allocated to another functional module of an encoder, so as to improve quality of a reconstructed audio signal of a decoder side and improve encoding quality.

For example, the saved bits may be used to encode the multi-channel audio signal, so as to reduce a compression rate of a data part and improve the quality of the reconstructed audio signal of the decoder side.

In other words, the encoded bitstream includes a control information part and the data part. The control information part may include the foregoing energy/amplitude equalization side information, and the data part may include the foregoing multi-channel audio signal. That is, the encoded bitstream includes the multi-channel audio signal and control information generated in a process of encoding the multi-channel audio signal. In this embodiment of this application, a quantity of bits occupied by the control information part may be reduced, to increase a quantity of bits occupied by the data part and further improve the quality of the reconstructed audio signal of the decoder side.

It should be noted that the saved bits may alternatively be used for transmission of other control information. This embodiment of this application is not limited by the foregoing examples.

In a possible design, the K channel pairs include a current channel pair, and equalization side information of the current channel pair includes fixed-point scaling ratios and scaling identifiers of the current channel pair. The fixed-point scaling ratio is a fixed-point value of an scaling ratio coefficient, the scaling ratio coefficient is obtained based on respective energy/amplitudes of audio signals of two channels of the current channel pair before equalization and respective energy/amplitudes of the audio signals of the two channels after equalization, the energy/amplitude scaling identifier is used to identify that the respective energy/amplitudes of the audio signals of the two channels of the current channel pair after equalization is or are increased or decreased relative to the respective energy/amplitudes of the audio signals before equalization.

In this implementation, the decoder side may perform energy de-equalization based on the fixed-point scaling ratios and the scaling identifiers of the current channel pair, to obtain a decoded signal.

A floating-point scaling ratio coefficient is transformed into the fixed-point scaling ratio. This can reduce bits occupied by the equalization side information, and further improve transmission efficiency.

In a possible design, the K channel pairs include the current channel pair, and the generating equalization side information of the K channel pairs based on the respective energy/amplitudes of the audio signals of the P channels includes: determining, based on the respective energy/amplitudes of the audio signals of the two channels of the current channel pair before equalization, the respective energy/amplitudes of the audio signals of the two channels of the current channel pair after energy/amplitude equalization; and generating the equalization side information of the current channel pair based on the respective energy/amplitudes of the audio signals of the two channels of the current channel pair before equalization and the respective energy/amplitudes of the audio signals of the two channels after equalization.

In this implementation, equalization is performed on the two channels of the channel pair, so that a large energy difference can still be maintained between channel pairs with a large energy difference after equalization. In this way, an encoding requirement of a channel pair with large energy/a large amplitude is met in a subsequent encoding processing procedure, encoding efficiency and encoding effect are improved, and the quality of the reconstructed audio signal of the decoder side is further improved.

In a possible design, the current channel pair includes a first channel and a second channel, and the equalization side information of the current channel pair includes a fixed-point scaling ratio of the first channel, a fixed-point scaling ratio of the second channel, an scaling identifier of the first channel, and an scaling identifier of the second channel.

In this implementation, the decoder side may perform energy de-equalization based on respective fixed-point scaling ratios and respective energy/amplitude scaling identifiers of the two channels of the current channel pair, to obtain the decoded signal, and further reduce bits occupied by the equalization side information of the current channel pair.

In a possible design, the generating the equalization side information of the current channel pair based on the respective energy/amplitudes of the audio signals of the two channels of the current channel pair before equalization and the respective energy/amplitudes of the audio signals of the two channels after equalization may include: determining an scaling ratio coefficient of a $q^{th}$ channel of the current channel pair and an scaling identifier of the $q^{th}$ channel based on energy/an amplitude of an audio signal of the $q^{th}$ channel before equalization and energy/an amplitude of the audio signal of the $q^{th}$ channel after equalization; and determining a fixed-point energy/amplitude scaling ratio of the $q^{th}$ channel based on the scaling ratio coefficient of the $q^{th}$ channel, where q is 1 or 2.

In a possible design, the determining, based on the respective energy/amplitudes of the audio signals of the two channels of the current channel pair after energy/amplitude equalization, the respective energy/amplitudes of the audio signals of the two channels of the current channel pair after equalization may include: determining an average value of the audio signals of the current channel pair based on the respective energy/amplitudes of the audio signals of the two channels of the current channel pair before equalization; and determining, based on the average value of the audio signals of the current channel pair, the respective energy/amplitudes of the audio signals of the two channels of the current channel pair after equalization.

In this implementation, equalization is performed on the two channels of the channel pair, so that a large energy difference can still be maintained between channel pairs with a large energy difference after equalization. In this way, an encoding requirement of a channel pair with large energy/a large amplitude is met in a subsequent encoding processing procedure, and the quality of the reconstructed audio signal of the decoder side is further improved.

In a possible design, the encoding the equalization side information of the K channel pairs and the audio signals of the P channels to obtain an encoded bitstream may include: encoding the equalization side information of the K channel pairs, K, respective channel pair indexes of the K channel pairs, and the audio signals of the P channels, to obtain the encoded bitstream.

According to a second aspect, an embodiment of this application provides a multi-channel audio signal decoding method. The method may include: obtaining a to-be-decoded bitstream; demultiplexing the to-be-decoded bitstream to obtain a current frame of a to-be-decoded multi-channel audio signal, a quantity K of channel pairs included in the current frame, respective channel pair indexes of the K channel pairs, and equalization side information of the K channel pairs; and decoding the current frame of the to-be-decoded multi-channel audio signal based on the respective channel pair indexes of the K channel pairs and the equalization side information of the K channel pairs, to obtain decoded signals of the current frame, where K is a positive integer, and each channel pair includes two channels.

In a possible design, the K channel pairs include a current channel pair, and equalization side information of the current channel pair includes fixed-point scaling ratios and scaling identifiers of the current channel pair. The fixed-point scaling ratio is a fixed-point value of an scaling ratio coefficient, the scaling ratio coefficient is obtained based on respective energy/amplitudes of audio signals of two channels of the current channel pair before equalization and respective energy/amplitudes of the audio signals of the two channels after equalization, the energy/amplitude scaling identifier is used to identify that the respective energy/amplitudes of the audio signals of the two channels of the current channel pair after equalization is or are increased or decreased relative to the respective energy/amplitudes of the audio signals before equalization.

In a possible design, the K channel pairs include the current channel pair, and the decoding the current frame of the to-be-decoded multi-channel audio signal based on the respective channel pair indexes of the K channel pairs and the equalization side information of the K channel pairs, to obtain decoded signals of the current frame may include: performing stereo decoding processing on the current frame of the to-be-decoded multi-channel audio signal based on a channel pair index corresponding to the current channel pair, to obtain the audio signals of the two channels of the current channel pair of the current frame; and performing de-equalization processing on the audio signals of the two channels of the current channel pair based on the equalization side information of the current channel pair, to obtain decoded signals of the two channels of the current channel pair.

In a possible design, the current channel pair includes a first channel and a second channel, and the equalization side information of the current channel pair includes a fixed-point scaling ratio of the first channel, a fixed-point scaling ratio of the second channel, an scaling identifier of the first channel, and an scaling identifier of the second channel.

For technical effects of the multi-channel audio signal decoding method, refer to the technical effects of the foregoing corresponding encoding method. Details are not described herein again.

According to a third aspect, an embodiment of this application provides an audio signal encoding apparatus. The audio signal encoding apparatus may be an audio encoder, a chip of an audio encoding device, a system on chip, or a functional module that is of an audio encoder and that is configured to perform the method according to any one of the first aspect or the possible designs of the first aspect. The audio signal encoding apparatus may implement functions performed in the first aspect or the possible designs of the first aspect, and the functions may be implemented by hardware executing corresponding software. The hardware or software includes one or more modules corresponding to the functions. For example, in a possible design, the audio signal encoding apparatus may include an obtaining module, an equalization side information generation module, and an encoding module.

According to a fourth aspect, an embodiment of this application provides an audio signal decoding apparatus.

The audio signal decoding apparatus may be an audio decoder, a chip of an audio decoding device, a system on chip, or a functional module that is of an audio decoder and that is configured to perform the method according to any one of the second aspect or the possible designs of the second aspect. The audio signal decoding apparatus may implement functions performed in the second aspect or the possible designs of the second aspect, and the functions may be implemented by hardware executing corresponding software. The hardware or software includes one or more modules corresponding to the functions. For example, in a possible design, the audio signal decoding apparatus may include an obtaining module, a demultiplexing module, and a decoding module.

According to a fifth aspect, an embodiment of this application provides an audio signal encoding apparatus, including a non-volatile memory and a processor that are coupled to each other. The processor invokes program code stored in the memory to perform the method according to any one of the first aspect or the possible designs of the first aspect.

According to a sixth aspect, an embodiment of this application provides an audio signal decoding apparatus, including a non-volatile memory and a processor that are coupled to each other. The processor invokes program code stored in the memory to perform the method according to any one of the second aspect or the possible designs of the second aspect.

According to a seventh aspect, an embodiment of this application provides an audio signal encoding device, including an encoder. The encoder is configured to perform the method according to any one of the first aspect or the possible designs of the first aspect.

According to an eighth aspect, an embodiment of this application provides an audio signal decoding device, including a decoder. The decoder is configured to perform the method according to any one of the second aspect or the possible designs of the second aspect.

According to a ninth aspect, an embodiment of this application provides a computer-readable storage medium, including the encoded bitstream obtained by using the method according to any one of the first aspect or the possible designs of the first aspect.

According to a tenth aspect, an embodiment of this application provides a computer-readable storage medium, including a computer program. When the computer program is executed on a computer, the computer is enabled to perform the method according to any one of the first aspect or the possible designs of the first aspect or the method according to any one of the second aspect or the possible designs of the second aspect.

According to an eleventh aspect, this application provides a computer program product. The computer program product includes a computer program. When the computer program is executed by a computer, the method according to any one of the first aspect or the method according to any one of the second aspect is performed.

According to a twelfth aspect, this application provides a chip, including a processor and a memory. The memory is configured to store a computer program, and the processor is configured to invoke and run the computer program stored in the memory, to perform the method according to any one of the first aspect or the method according to any one of the second aspect.

According to a thirteenth aspect, this application provides a coding device. The coding device includes an encoder and a decoder. The encoder is configured to perform the method according to any one of the first aspect or the possible designs of the first aspect. The decoder is configured to perform the method according to any one of the second aspect or the possible designs of the second aspect.

According to the multi-channel audio signal encoding and decoding methods and apparatuses in embodiments of this application, the audio signals of the P channels in the current frame of the multi-channel audio signal and the respective energy/amplitudes of the audio signals of the P channels are obtained, the P channels include K channel pairs, the equalization side information of the K channel pairs is generated based on the respective energy/amplitudes of the audio signals of the P channels, and the equalization side information of the K channel pairs and the audio signals of the P channels are encoded to obtain the encoded bitstream. The equalization side information of the channel pairs is generated, and the encoded bitstream carries the equalization side information of the K channel pairs without carrying equalization side information of an uncoupled channel. This can reduce a quantity of bits of equalization side information in the encoded bitstream and a quantity of bits of multi-channel side information. In addition, saved bits can be allocated to another functional module of an encoder, so as to improve quality of a reconstructed audio signal of a decoder side and improve coding quality.

DESCRIPTION OF EMBODIMENTS

Terms such as "first" and "second" in embodiments of this application are only used for distinguishing description, but cannot be understood as indicating or implying relative importance or a sequence. In addition, the terms "include", "comprise", or any other variant thereof are intended to cover a non-exclusive inclusion, for example, a series of steps or units. Methods, systems, products, or devices are not necessarily limited to those steps or units that are literally enumerated, but may include other steps or units that are not literally enumerated or that are inherent to such processes, methods, products, or devices.

It should be understood that, in this application, "at least one (item)" means one or more and "a plurality of" means two or more. The term "and/or" is used for describing an association relationship between associated objects, and represents that three relationships may exist. For example, "A and/or B" may represent the following three cases: Only A exists, only B exists, and both A and B exist, where A and B may be singular or plural. The character "/" generally indicates an "or" relationship between the associated objects. "At least one of the following items (pieces)" or a similar expression thereof means any combination of these items, including a single item (piece) or any combination of a plurality of items (pieces). For example, at least one of a, b, or c may represent: a, b, c, "a and b", "a and c", "b and c", or "a, b and c". Each of a, b, and c may be singular or plural. Alternatively, some of a, b, and c may be singular; and some of a, b, and c may be plural.

Figure 1:
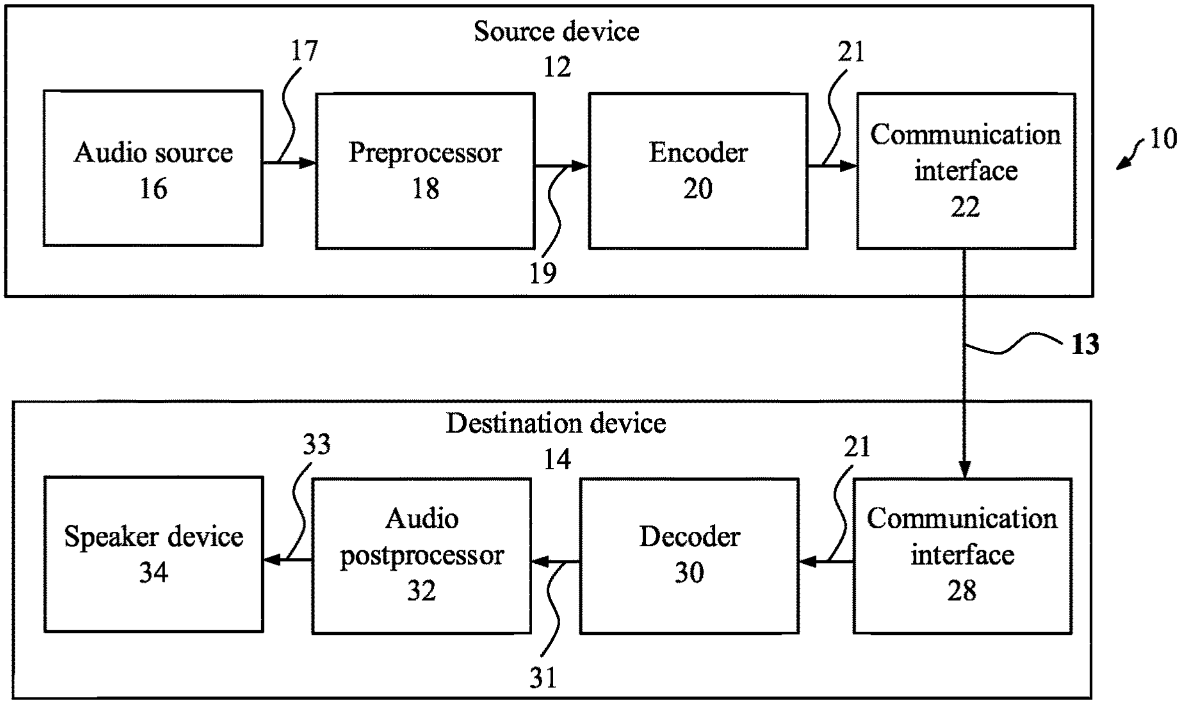
FIG. 1 is a schematic diagram of an example of an audio coding system according to an embodiment of this application.

The following describes a system architecture to which an embodiment of this application is applied. Refer to FIG. 1. FIG. 1 shows a schematic block diagram of an example of an audio coding system 10 to which an embodiment of this application is applied. As shown in FIG. 1, the audio coding system 10 may include a source device 12 and a destination device 14. The source device 12 generates encoded audio data. Therefore, the source device 12 may be referred to as an audio encoding apparatus. The destination device 14 can decode the encoded audio data generated by the source device 12. Therefore, the destination device 14 may be referred to as an audio decoding apparatus. In various implementation solutions, the source device 12, the destination device 14, or both the source device 12 and the destination device 14 may include at least one processor and a memory coupled to the at least one processor. The memory may include but is not limited to a RAM, a ROM, an EEPROM, a flash memory, or any other medium that can be used to store desired program code in a form of an instruction or a data structure accessible to a computer, as described in this specification. The source device 12 and the destination device 14 may include various apparatuses, including a desktop computer, a mobile computing apparatus, a notebook (for example, a laptop) computer, a tablet, a set-top box, a telephone handset such as a "smart" phone, a television set, a speaker, a digital media player, a video game console, an in-vehicle computer, any wearable device, a virtual reality (VR) device, a server providing a VR service, an augmented reality (AR) device, a server providing an AR service, a wireless communication device, and a similar device thereof.

Although FIG. 1 depicts the source device 12 and the destination device 14 as separate devices, a device embodiment may alternatively include both the source device 12 and the destination device 14 or functionalities of both the source device 12 and the destination device 14, that is, the source device 12 or a corresponding functionality and the destination device 14 or a corresponding functionality. In these embodiments, the source device 12 or the corresponding functionality and the destination device 14 or the corresponding functionality may be implemented by using same hardware and/or software, separate hardware and/or software, or any combination thereof.

A communication connection between the source device 12 and the destination device 14 may be implemented over a link 13, and the destination device 14 may receive encoded audio data from the source device 12 over the link 13. The link 13 may include one or more media or apparatuses capable of moving the encoded audio data from the source device 12 to the destination device 14. In an example, the link 13 may include one or more communication media that enable the source device 12 to directly transmit the encoded audio data to the destination device 14 in real time. In this example, the source device 12 can modulate the encoded audio data according to a communication standard (for example, a wireless communication protocol), and can transmit modulated audio data to the destination device 14. The one or more communication media may include a wireless communication medium and/or a wired communication medium, for example, a radio frequency (RF) spectrum or one or more physical transmission lines. The one or more communication media may form a part of a packet-based network, and the packet-based network is, for example, a local area network, a wide area network, or a global network (for example, the internet). The one or more communication media may include a router, a switch, a base station, or another device that facilitates communication from the source device 12 to the destination device 14.

The source device 12 includes an encoder 20. Optionally, the source device 12 may further include an audio source 16, a preprocessor 18, and a communication interface 22. In a specific implementation, the encoder 20, the audio source 16, the preprocessor 18, and the communication interface 22 may be hardware components in the source device 12, or may be software programs in the source device 12. They are separately described as follows.

The audio source 16 may include or may be a sound capture device of any type, configured to capture, for example, sound from the real world, and/or an audio generation device of any type. The audio source 16 may be a microphone configured to capture sound or a memory configured to store audio data, and the audio source 16 may further include any type of (internal or external) interface for storing previously captured or generated audio data and/or for obtaining or receiving audio data. When the audio source 16 is a microphone, the audio source 16 may be, for example, a local microphone or a microphone integrated into the source device. When the audio source 16 is a memory, the audio source 16 may be, for example, a local memory or a memory integrated into the source device. When the audio source 16 includes an interface, the interface may be, for example, an external interface for receiving audio data from an external audio source. For example, the external audio source is an external sound capture device such as a microphone, an external storage, or an external audio generation device. The interface may be any type of interface, for example, a wired or wireless interface or an optical interface, according to any proprietary or standardized interface protocol.

In this embodiment of this application, the audio data transmitted from the audio source 16 to the preprocessor 18 may also be referred to as raw audio data 17.

The preprocessor 18 is configured to receive and preprocess the raw audio data 17, to obtain preprocessed audio 19 or preprocessed audio data 19. For example, preprocessing performed by the preprocessor 18 may include filtering or noise reduction.

The encoder 20 (or referred to as an audio encoder 20) is configured to receive the preprocessed audio data 19, and is configured to perform encoding method embodiments described below, to implement application of an audio signal encoding method described in this application on an encoder side.

The communication interface 22 may be configured to receive encoded audio data 21, and transmit the encoded audio data 21 to the destination device 14 or any other device (for example, a memory) over the link 13 for storage or direct reconstruction. The other device may be any device used for decoding or storage. The communication interface 22 may be, for example, configured to encapsulate the encoded audio data 21 into an appropriate format, for example, a data packet, for transmission over the link 13.

The destination device 14 includes a decoder 30. Optionally, the destination device 14 may further include a communication interface 28, an audio postprocessor 32, and a speaker device 34. They are separately described as follows.

The communication interface 28 may be configured to receive the encoded audio data 21 from the source device 12 or any other source. The any other source is, for example, a storage device. The storage device is, for example, a device for storing the encoded audio data. The communication interface 28 may be configured to transmit or receive the encoded audio data 21 over the link 13 between the source device 12 and the destination device 14 or through any type of network. The link 13 is, for example, a direct wired or wireless connection. The any type of network is, for example, a wired or wireless network or any combination thereof, or any type of private or public network, or any combination thereof. The communication interface 28 may be, for example, configured to decapsulate the data packet transmitted through the communication interface 22, to obtain the encoded audio data 21.

Both the communication interface 28 and the communication interface 22 may be configured as unidirectional communication interfaces or bidirectional communication interfaces, and may be configured to, for example, send and receive messages to establish a connection, and acknowledge and exchange any other information related to a communication link and/or data transmission such as encoded audio data transmission.

The decoder 30 (or referred to as a decoder 30) is configured to receive the encoded audio data 21, and provide decoded audio data 31 or decoded audio 31. In some embodiments, the decoder 30 may be configured to perform decoding method embodiments described below, to implement application of an audio signal decoding method described in this application on a decoder side.

The audio postprocessor 32 is configured to postprocess the decoded audio data 31 (also referred to as reconstructed audio data) to obtain postprocessed audio data 33. Postprocessing performed by the audio postprocessor 32 may include, for example, rendering or any other processing, and may be further configured to transmit the postprocessed audio data 33 to the speaker device 34.

The speaker device 34 is configured to receive the postprocessed audio data 33 to play audio to, for example, a user or a viewer. The speaker device 34 may be or may include any type of speaker configured to play reconstructed sound.

Although FIG. 1 depicts the source device 12 and the destination device 14 as separate devices, a device embodiment may alternatively include both the source device 12 and the destination device 14 or functionalities of both the source device 12 and the destination device 14, that is, the source device 12 or a corresponding functionality and the destination device 14 or a corresponding functionality. In these embodiments, the source device 12 or the corresponding functionality and the destination device 14 or the corresponding functionality may be implemented by using same hardware and/or software, separate hardware and/or software, or any combination thereof.

As will be apparent for a person skilled in the art based on the descriptions, existence and (exact) split of functionalities of the different units or functionalities of the source device 12 and/or the destination device 14 shown in FIG. 1 may vary depend on an actual device and application. The source device 12 and the destination device 14 may include any one of a wide range of devices, including any type of handheld or stationary device, for example, a notebook or laptop computer, a mobile phone, a smartphone, a pad or a tablet computer, a video camera, a desktop computer, a set-top box, a television set, a camera, an in-vehicle device, a sound box, a digital media player, an audio game console, an audio streaming transmission device (such as a content service server or a content distribution server), a broadcast receiver device, a broadcast transmitter device, smart glasses, or a smart watch, and may not use or may use any type of operating system.

The encoder 20 and the decoder 30 each may be implemented as any one of various appropriate circuits, for example, one or more microprocessors, digital signal processors (DSP), application-specific integrated circuits (ASIC), field-programmable gate arrays (FPGA), discrete logic, hardware, or any combinations thereof. If the technologies are implemented partially by using software, a device may store software instructions in an appropriate and non-transitory computer-readable storage medium and may execute the instructions by using hardware such as at least one processor, to perform the technologies of this disclosure. Any one of the foregoing content (including hardware, software, a combination of hardware and software, and the like) may be considered as at least one processor.

In some cases, the audio coding system 10 shown in FIG. 1 is merely an example, and the technologies of this application are applicable to audio coding settings (for example, audio encoding or audio decoding) that do not necessarily include any data communication between an encoding device and a decoding device. In another example, data may be retrieved from a local memory, transmitted in a streaming manner through a network, or the like. An audio encoding device may encode data and store data into the memory, and/or an audio decoding device may retrieve and decode the data from the memory. In some examples, encoding and decoding are performed by devices that do not communicate with one another, but simply encode data to the memory and/or retrieve and decode data from the memory.

The encoder may be a multi-channel encoder, for example, a stereo encoder, a 5.1-channel encoder, or a 7.1-channel encoder.

The audio data may also be referred to as an audio signal. The audio signal in this embodiment of this application is an input signal in an audio encoding device. The audio signal may include a plurality of frames. For example, a current frame may be specifically a frame in the audio signal. In embodiments of this application, audio signal encoding and decoding of the current frame are used as an example for description. A previous frame or a next frame of the current frame in the audio signal may be correspondingly encoded and decoded based on audio signal encoding and decoding manners of the current frame. Encoding and decoding processes of the previous frame or the next frame of the current frame in the audio signal are not described one by one. In addition, the audio signal in embodiments of this application may be a multi-channel audio signal, that is, includes P channels. Embodiments of this application are used to perform multi-channel audio signal coding.

The encoder may perform a multi-channel audio signal encoding method in embodiments of this application, to reduce a quantity of bits of multi-channel side information. In this way, saved bits can be allocated to another functional module of the encoder, to improve quality of a reconstructed audio signal of a decoder side and improve encoding quality. For a specific implementation thereof, refer to specific explanation and description of the following embodiment.

Figure 2:
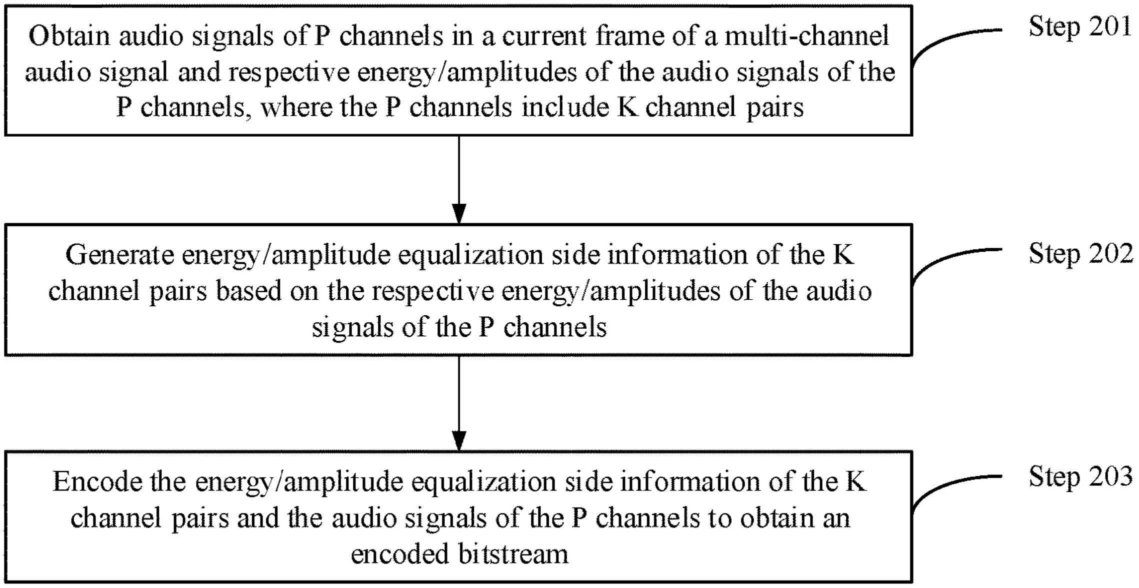
FIG. 2 is a flowchart of a multi-channel audio signal encoding method according to an embodiment of this application.

FIG. 2 is a flowchart of a multi-channel audio signal encoding method according to an embodiment of this application. This embodiment of this application may be performed by the foregoing encoder. As shown in FIG. 2, the method in this embodiment may include the following steps.

Step 201: Obtain audio signals of P channels in a current frame of a multi-channel audio signal and respective energy/amplitudes of the audio signals of the P channels, where the P channels include K channel pairs. The multi-channel signal may be signals of 5.1 channels (correspondingly, P satisfies 5+1=6), signals of 7.1 channels (correspondingly, P satisfies 7+1=8), signals of 11.1 channels (correspondingly, P satisfies 11+1=12), or the like.

Each channel pair (channel pair) includes two channels. P is a positive integer greater than 1, K is a positive integer, and P is greater than or equal to K×2.

In some embodiments, P=2K. Multi-channel signal screening and coupling are performed on the current frame of the multi-channel audio signal to obtain the K channel pairs. The P channels include the K channel pairs.

In some embodiments, P=2×K+Q, and Q is a positive integer. The audio signals of the P channels further include audio signals of Q uncoupled mono channels. Signals of 5.1 channels are used as an example. The 5.1 channels include a left (L) channel, a right (R) channel, a center (C) channel, a low frequency effect (LFE) channel, a left surround (LS) channel, and a right surround (RS) channel. Channels participating in multi-channel processing are obtained through screening from the 5.1 channels based on a multi-channel processing indicator (MultiProcFlag), for example, the channels participating in multi-channel processing include the L channel, the R channel, the C channel, the LS channel, and the RS channel. Coupling is performed between channels participating in multi-channel processing. For example, the L channel and the R channel are coupled to form a first channel pair. The LS channel and the RS channel are coupled to form a second channel pair. The LFE channel and the C channel are uncoupled channels. That is, P=6, K=2, and Q=2. The P channels include the first channel pair, the second channel pair, and the LFE channel and the C channel that are not coupled.

For example, a manner of performing coupling between the channels participating in multi-channel processing may be that K channel pairs are determined through a plurality of iterations, that is, one channel pair is determined in one iteration. For example, inter-channel correlation values between any two of the P channels participating in multi-channel processing are calculated in a first iteration, and two channels with highest inter-channel correlation values are selected in the first iteration to form a channel pair. Two channels with highest inter-channel correlation values in remaining channels (channels in the P channels other than the coupled channels) are selected in a second iteration to form a channel pair. By analogy, the K channel pairs are obtained.

It should be noted that, in this embodiment of this application, another coupling manner may alternatively be used to determine the K channel pairs. The foregoing example description of coupling is not limited in this embodiment of this application.

Step 202: Generate equalization side information of the K channel pairs based on the respective energy/amplitudes of the audio signals of the P channels.

It should be noted that "energy/amplitude" in this embodiment of this application represents energy or an amplitude. In addition, in an actual processing procedure, for processing of a frame, if energy processing performed at the beginning, energy processing is performed in all subsequent processing; or if amplitude processing is performed at the beginning, amplitude processing is performed in all subsequent processing.

For example, the energy equalization side information of the K channel pairs is generated based on the energy of the audio signals of the P channels. That is, energy equalization is performed by using the energy of the P channels, to obtain the energy equalization side information. Alternatively, the energy equalization side information of the K channel pairs is generated based on the amplitudes of the audio signals of the P channels. That is, energy equalization is performed by using the amplitudes of the P channels, to obtain the energy equalization side information. Alternatively, the amplitude equalization side information of the K channel pairs is generated based on the amplitudes of the audio signals of the P channels. That is, amplitude equalization is performed by using the amplitudes of the P channels, to obtain the amplitude equalization side information.

Specifically, stereo encoding processing is performed on a channel pair in this embodiment of the present disclosure, to improve encoding efficiency and encoding effect. For example, before stereo encoding processing is performed on a current channel pair, equalization may be first performed on energy/amplitudes of audio signals of two channels of the current channel pair, to obtain energy/amplitudes of audio signals of the two channels after equalization, and then subsequent stereo encoding processing is performed based on the energy/amplitudes after equalization. In an implementation, equalization may be performed based on the audio signals of the two channels of the current channel pair, instead of an audio signal corresponding to a mono channel and/or a channel pair other than the current channel pair. In another implementation, equalization may alternatively be performed based on an audio signal corresponding to another channel pair and/or a mono channel, in addition to the audio signals of the two channels of the current channel pair.

The equalization side information is used by the decoder side to perform de-equalization, so as to obtain a decoded signal.

In an implementation, the equalization side information may include a fixed-point scaling ratio and an scaling identifier. The fixed-point scaling ratio is a fixed-point value of an energy/amplitude scaling ratio coefficient, the scaling ratio coefficient is obtained based on energy/an amplitude before equalization and energy/an amplitude after equalization, and the scaling identifier is used to identify that the after equalization is or are increased or decreased relative to the before equalization. The energy/amplitude scaling ratio coefficient may be an scaling ratio coefficient, and the scaling ratio coefficient is between (0, 1).

A channel pair is used as an example. Energy/amplitude equalization side information of the channel pair may include fixed-point scaling ratios and scaling identifiers of the channel pair. For example, the channel pair includes a first channel and a second channel, and the fixed-point scaling ratio of the channel pair includes a fixed-point scaling ratio of the first channel and a fixed-point scaling ratio of the second channel. The scaling identifiers of the channel pair include an scaling identifier of the first channel and an scaling identifier of the second channel. The first channel is used as an example. The fixed-point scaling ratio of the first channel is a fixed-point value of the scaling ratio coefficient of the first channel. The scaling ratio coefficient of the first channel is obtained based on energy/an amplitude of an audio signal of the first channel before equalization and energy/an amplitude of the audio signal of the first channel after equalization. The scaling identifier of the first channel is obtained based on the of the audio signal of the first channel before equalization and the of the audio signal of the first channel after energy/amplitude equalization. For example, the scaling ratio coefficient of the first channel is a value obtained by dividing, by a larger one between the of the audio signal of the first channel before equalization and the of the audio signal of the first channel after equalization, a smaller one between the of the audio signal of the first channel before equalization and the of the audio signal of the first channel after energy/amplitude equalization. For example, if the of the audio signal of the first channel before equalization is greater than the of the audio signal of the first channel after equalization, the scaling ratio coefficient of the first channel is a value obtained by dividing, by the of the audio signal of the first channel before equalization, the of the audio signal of the first channel after equalization. When the of the audio signal of the first channel before equalization is greater than the of the audio signal of the first channel after equalization, the scaling identifier of the first channel is 1. When the of the audio signal of the first channel before equalization is less than or equal to the of the audio signal of the first channel after energy/amplitude equalization, the scaling identifier of the first channel is 0. Certainly, it may be understood that, when the of the audio signal of the first channel before equalization is greater than the of the audio signal of the first channel after equalization, the scaling identifier of the first channel may alternatively be set to 0. Implementation principles thereof are similar, and this embodiment of this application is not limited by the foregoing description.

The scaling ratio coefficient in this embodiment of this application may also be referred to as a floating-point scaling ratio coefficient.

In another implementation, the equalization side information may include a fixed-point scaling ratio. The fixed-point scaling ratio is a fixed-point value of an scaling ratio coefficient, and the scaling ratio coefficient is a ratio of energy/an amplitude before equalization to energy/an amplitude after equalization. That is, the scaling ratio coefficient is a value obtained by dividing, by the after equalization, the before equalization. When the scaling ratio coefficient is less than 1, the decoder side may determine that the after energy/amplitude equalization is increased relative to the before equalization. When the scaling ratio coefficient is greater than 1, the decoder side may determine that the after equalization is decreased relative to the before equalization. Certainly, it may be understood that the scaling ratio coefficient may alternatively be a value obtained by dividing, by the before equalization, the energy/amplitude after equalization. Implementation principles thereof are similar. This embodiment of this application is not limited by the foregoing description. In this implementation, the equalization side information may include no scaling identifiers.

Step 203: Encode the equalization side information of the K channel pairs and the audio signals of the P channels to obtain an encoded bitstream.

The equalization side information of the K channel pairs and the audio signals of the P channels are encoded to obtain the encoded bitstream. That is, the equalization side information of the K channel pairs is written into the encoded bitstream. In other words, the encoded bitstream carries the energy/amplitude equalization side information of the K channel pairs, instead of equalization side information of an uncoupled channel. This can reduce a quantity of bits of equalization side information in the encoded bitstream.

In some embodiments, the encoded bitstream further carries a quantity of channel pairs in the current frame and K channel pair indexes, and the quantity of channel pairs and the K channel pair indexes are used by the decoder side to perform processing such as stereo decoding and de-equalization. A channel pair index indicates two channels included in a channel pair. In other words, an implementation of step 203 is to encode the equalization side information of the K channel pairs, the quantity of channel pairs, K channel pair indexes, and the audio signals of the P channels, to obtain the encoded bitstream. The quantity of channel pairs may be K. The K channel pair indexes include channel pair indexes corresponding to the K channel pairs.

A sequence of writing the quantity of channel pairs, the K channel pair indexes, and the equalization side information of the K channel pairs into the encoded bitstream may be as follows: The quantity of channel pairs is written first, so that the decoder side first obtains the quantity of channel pairs when decoding the received bitstream. Then, the K channel pair indexes and the equalization side information of the K channel pairs are written.

It should be further noted that the quantity of channel pairs may be 0, that is, there are no coupled channels. In this case, the quantity of channel pairs and the audio signals of the P channels are encoded to obtain the encoded bitstream. The decoder side decodes the received bitstream, and first learns that the quantity of channel pairs is 0. In this case, the decoder side may directly decode the current frame of the to-be-decoded multi-channel audio signal without performing parsing to obtain the equalization side information.

Before the encoded bitstream is obtained, equalization may be further performed on coefficients in the current frame of the channel based on fixed-point scaling ratio and the scaling identifier of the channel.

In this embodiment, the P channels of the current frame of the multi-channel audio signal are obtained, where the P channels include the K channel pairs; the energy/amplitude equalization side information of the K channel pairs is generated based on the energy/amplitudes of the audio signals of the P channels; and the audio signals of the P channels are encoded based on the equalization side information of the K channel pairs, to obtain the encoded bitstream. The equalization side information of the channel pairs is generated, and the encoded bitstream carries the equalization side information of the K channel pairs without carrying equalization side information of an uncoupled channel. This can reduce a quantity of bits of energy/ amplitude equalization side information in the encoded bitstream and a quantity of bits of multi-channel side information. In addition, saved bits can be allocated to another functional module of an encoder, so as to improve quality of a reconstructed audio signal of the decoder side and improve coding quality.

Figure 3:
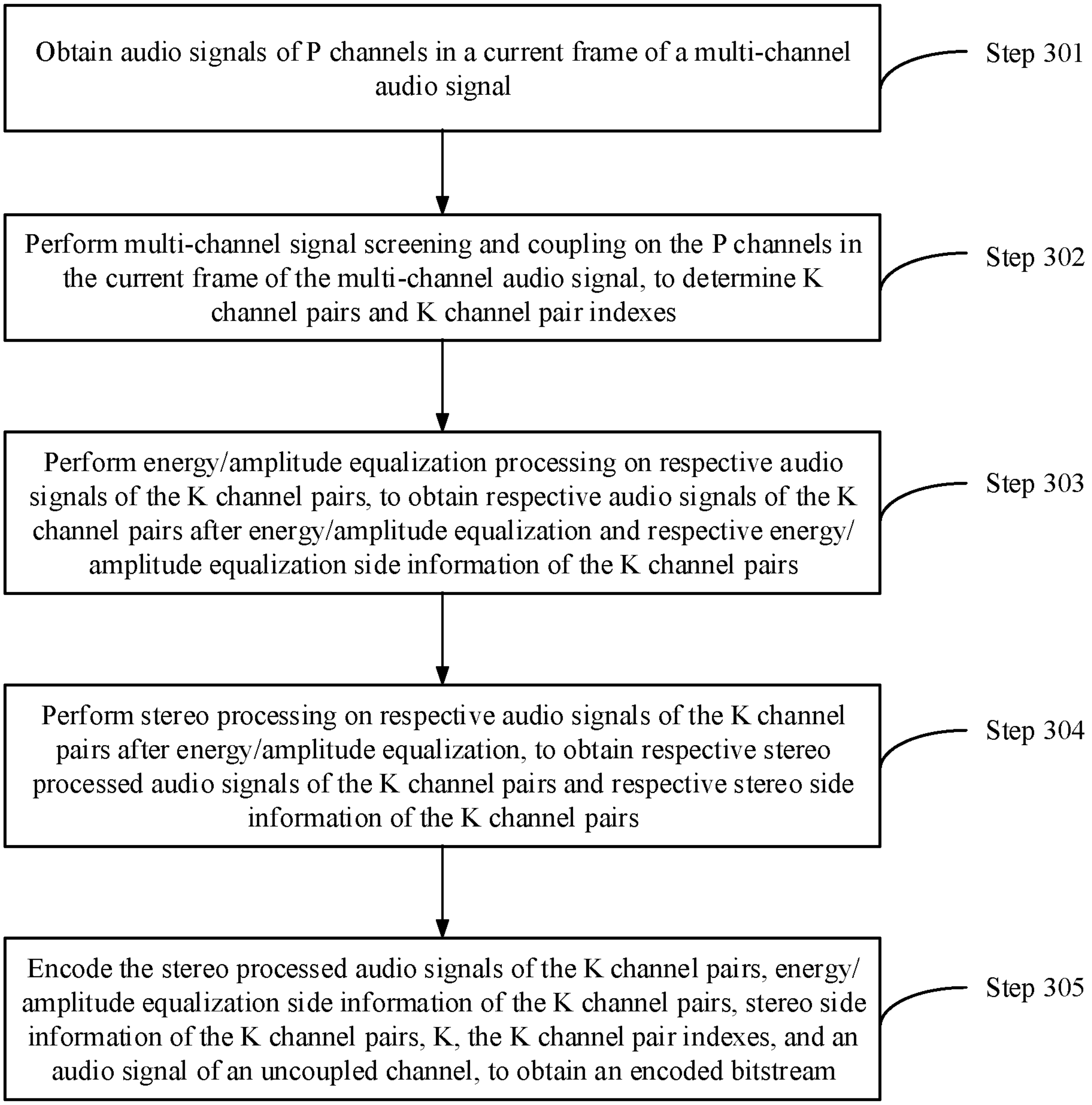
FIG. 3 is a flowchart of a multi-channel audio signal encoding method according to an embodiment of this application.

FIG. 3 is a flowchart of a multi-channel audio signal encoding method according to an embodiment of this application. This embodiment of this application may be performed by the foregoing encoder. This embodiment is a specific implementation of the method in the embodiment shown in FIG. 2. As shown in FIG. 3, the method in this embodiment may include the following steps.

Step 301: Obtain audio signals of P channels in a current frame of a multi-channel audio signal.

Step 302: Perform multi-channel signal screening and coupling on the P channels in the current frame of the multi-channel audio signal, to determine K channel pairs and K channel pair indexes.

For specific implementations of screening and coupling, refer to the explanation and description of step 201 in the embodiment shown in FIG. 2.

A channel pair index indicates two channels included in a channel pair. Different values of the channel pair index correspond to two different channel pairs. A correspondence between a value of a channel pair index and two channels may be preset.

Signals of 5.1 channels are used as an example. For example, an L channel and an R channel are coupled through filtering and coupling, to form a first channel pair. An LS channel and an RS channel are coupled to form a second channel pair. An LFE channel and a C channel are uncoupled channels. That is, K=2. A first channel pair index indicates that the L channel and the R channel are coupled. For example, a value of the first channel pair index is 0. A second channel pair index indicates that the LS channel and the RS channel are coupled. For example, a value of the second channel pair index is 9.

Step 303: Perform equalization processing on respective audio signals of the K channel pairs, to obtain respective audio signals of the K channel pairs after equalization and respective equalization side information of the K channel pairs.

Energy/amplitude equalization processing of a channel pair is used as an example. In an implementation, equalization processing is performed at a granularity of a channel pair: Respective energy/amplitudes of audio signals of two channels of the channel pair after equalization is or are determined based on respective energy/amplitudes of the audio signals of the two channels of the channel pair before equalization. Energy/amplitude equalization side information of the current channel pair is generated based on the respective energy/amplitudes of the audio signals of the two channels of the channel pair before equalization and the respective energy/amplitudes of the audio signals of the two channels after equalization, and audio signals of the two channels after equalization are obtained.

For determining the respective energy/amplitudes of the audio signals of the two channels of the channel pair after equalization, the following manner may be used: determining an average value of the audio signals of the channel pair based on the respective energy/amplitudes of the audio signals of the two channels of the channel pair before equalization, and determining, based on the average value of the audio signals of the channel pair, the respective energy/amplitudes of the audio signals of the two channels of the channel pair after equalization. For example, the respective energy/amplitudes of the audio signals of the two channels of the channel pair after equalization is or are equal, and each are the average value of the audio signals of the channel pair.

As described above, a channel pair may include a first channel and a second channel, and equalization side information of the channel pair includes a fixed-point scaling ratio of the first channel, a fixed-point scaling ratio of the second channel, an scaling identifier of the first channel, and an scaling identifier of the second channel.

In some embodiments, an scaling ratio coefficient of a $q^{th}$ channel of the channel pair may be determined based on energy/an amplitude of an audio signal of the $q^{th}$ channel before equalization and energy/an amplitude of the audio signal of the $q^{th}$ channel after equalization. A fixed-point scaling ratio of the $q^{th}$ channel is determined based on the scaling ratio coefficient of the $q^{th}$ channel. An scaling identifier of the $q^{th}$ channel is determined based on the of the audio signal of the $q^{th}$ channel before energy/amplitude equalization and the of the audio signal of the $q^{th}$ channel after equalization. q is 1 or 2.

For example, a fixed-point scaling ratio of a $q^{th}$ channel of a channel pair and an scaling identifier of the $q^{th}$ channel may be determined according to the following formulas (1) to (3).

The fixed-point scaling ratio of the $q^{th}$ channel is calculated according to formulas (1) and (2).

$$\text{scaleInt\_}q=\text{ceil}((1<<M)\times\text{scale}F\_q) \qquad (1)$$

$$\text{scaleInt\_}q=\text{clip}(\text{scaleInt\_}q,1,2^{M}-1) \qquad (2)$$

scaleInt_q is the fixed-point scaling ratio of the $q^{th}$ channel, scaleF_q is a floating-point scaling ratio of the $q^{th}$ channel, M is a fixed-point quantity of bits for change from the floating-point scaling ratio coefficient to the fixed-point scaling ratio, a function clip(x, a, b) is a bidirectional clip function that clips x between [a, b], clip((x), (a), (b))=max(a, min(b, (x))), a≤b, and ceil(x) is a function that rounds up x. M may be any integer, for example, M is 4.

When energy_q is greater than energy_$q_e$, energyBigFlag_q is set to 1; or when energy_q is less than or equal to energy_$q_e$, energyBigFlag_q is set to 0.

energy_q is the of the audio signal of the $q^{th}$ channel before equalization, energy_$q_e$ is the of the audio signal of the $q^{th}$ channel after equalization, and energyBigFlag_q is the energy/amplitude scaling identifier of the $q^{th}$ channel. energy_$q_e$ may be an average value of the two channels of the channel pair.

A manner of determining scaleF_q in the foregoing formula (1) is: When energy_q is greater than energy_$q_e$, scaleF_q is equal to energy_$q_e$/energy_q; or when energy_q is less than or equal to energy_$q_e$, scaleF_q is equal to energy_q/energy_$q_e$.

energy_q is the of the audio signal of the $q^{th}$ channel before equalization, energy_$q_e$ is the of the audio signal of the $q^{th}$ channel after equalization, and scaleF_q is the floating-point scaling ratio coefficient of the $q^{th}$ channel.

energy_q is determined according to the following formula (3):

$$\text{energy\_}q=\left(\sum_{i=1}^{N}\text{sampleCoef}(q,i)\times\text{sample\_Coef}(q,i)\right)^{1/2} \qquad (3)$$

sample_Coef (q, i) represents an $i^{th}$ coefficient of an audio signal of the $q^{th}$ channel in a current frame before equalization, and N is a quantity of frequency domain coefficients of the current frame.

In an equalization processing procedure, energy/amplitude equalization may be performed on the audio signal of the $q^{th}$ channel in the current frame based on the fixed-point scaling ratio of the $q^{th}$ channel and the energy/amplitude scaling identifier of the $q^{th}$ channel, to obtain an audio signal of the $q^{th}$ channel after equalization.

For example, if energyBigFlag_q is 1, $q_e(i)=q(i)\times scaleInt\_q/(1<<M)$; or when energyBigFlag_q is 0, $q_e(i)=q(i)\times(1<<M)/scaleInt\_q$.

i is used to identify a coefficient of the current frame, q(i) is an $i^{th}$ frequency domain coefficient of a $q^{th}$ channel of a current frame before equalization, and $q_e(i)$ is an $i^{th}$ frequency domain coefficient of a $q^{th}$ channel of a current frame after energy/amplitude equalization, M is a quantity of fixed-pointed bits for change from the floating-point scaling ratio coefficient to the fixed-point scaling ratio coefficient.

In another implementation, equalization processing is performed at a granularity of all channels, all channel pairs, or a part of channels in all channels. For example, an average value of the audio signals of the P channels is determined based on respective energy/amplitudes of the audio signals of the P channels before equalization, and respective energy or amplitudes of audio signals of two channels of a channel pair after equalization is determined based on the average value of the audio signals of the P channels. For example, the average value of the audio signals of the P channels may be used as energy or an amplitude of an audio signal of any channel in a channel pair after energy/amplitude equalization. That is, a manner of determining the energy or the amplitude after equalization is different from that in the foregoing possible implementation, and a manner of determining equalization side information may be the same as that in the foregoing possible implementation. For specific implementations of the manners, refer to the foregoing description. Details are not described herein again.

In the foregoing embodiment, the equalization side information of the current channel pair includes the fixed-point scaling ratio and the scaling identifier of the first channel, and the fixed-point energy/amplitude scaling ratio and the scaling identifier of the second channel. That is, for a current channel (the first channel or the second channel), the side information includes both the fixed-point scaling ratio and the scaling identifier. This is caused by the following reason: Because the scaling ratio is obtained as a ratio of a larger one between energy/an amplitude of an audio signal of the current channel before equalization and energy/an amplitude of an audio signal of the current channel after equalization to a smaller one, or a ratio of a smaller one to a larger one, the obtained scaling ratio is fixedly greater than or equal to 1 or the obtained scaling ratio is fixedly less than or equal to 1. As a result, whether the of the audio signal after equalization is greater than the of the audio signal before equalization cannot be determined by using only the scaling ratio or the fixed-point scaling ratio, and therefore an scaling identifier is required for indication.

In another embodiment of this aspect, the of the audio signal of the current channel before equalization and the of the audio signal of the current channel after equalization may be fixedly used. Alternatively, the of the current channel after equalization and the of the current channel before equalization are fixedly used. In this case, the scaling identifier does not need to be used for indication. Correspondingly, the side information of the current channel may include a fixed-point scaling ratio, but does not need to include an scaling identifier.

Step 304: Perform stereo processing on respective audio signals of the K channel pairs after equalization, to obtain respective stereo processed audio signals of the K channel pairs and respective stereo side information of the K channel pairs.

A channel pair is used as an example. Stereo processing is performed on audio signals of two channels of the channel pair after equalization, to obtain stereo processed audio signals of the two channels and generate stereo side information of the channel pair.

Step 305: Encode the stereo processed audio signals of the K channel pairs, equalization side information of the K channel pairs, stereo side information of the K channel pairs, K, the K channel pair indexes, and an audio signal of an uncoupled channel, to obtain an encoded bitstream.

The stereo processed audio signals of the K channel pairs, the energy/amplitude equalization side information of the K channel pairs, the stereo side information of the K channel pairs, a quantity (K) of channel pairs, the K channel pair indexes, and the audio signal of the uncoupled channel are encoded to obtain the encoded bitstream for a decoder side to perform decoding to obtain a reconstructed audio signal.

In this embodiment, the audio signals of the P channels in the current frame of the multi-channel audio signal are obtained, multi-channel signal screening and coupling are performed on the P channels in the current frame of the multi-channel audio signal to determine the K channel pairs and the K channel pair indexes, equalization processing is performed on the respective audio signals of the K channel pairs to obtain the respective audio signals of the K channel pairs after equalization and the respective equalization side information of the K channel pairs, stereo processing is performed on the respective audio signals of the K channel pairs after energy/amplitude equalization to obtain the respective stereo processed audio signals of the K channel pairs and the respective stereo side information of the K channel pairs, and the stereo processed audio signals of the K channel pairs, the equalization side information of the K channel pairs, the stereo side information of the K channel pairs, K, the K channel pair indexes, and the audio signal of the uncoupled channel are encoded to obtain the encoded bitstream. The equalization side information of the channel pairs is generated, and the encoded bitstream carries the equalization side information of the K channel pairs without carrying equalization side information of an uncoupled channel. This can reduce a quantity of bits of equalization side information in the encoded bitstream and a quantity of bits of multi-channel side information. In addition, saved bits can be allocated to another functional module of an encoder, so as to improve quality of the reconstructed audio signal of the decoder side and improve coding quality.

Signals of 5.1 channels are used as an example in the following embodiment to describe a multi-channel audio signal encoding method in this embodiment of this application.

Figure 4:
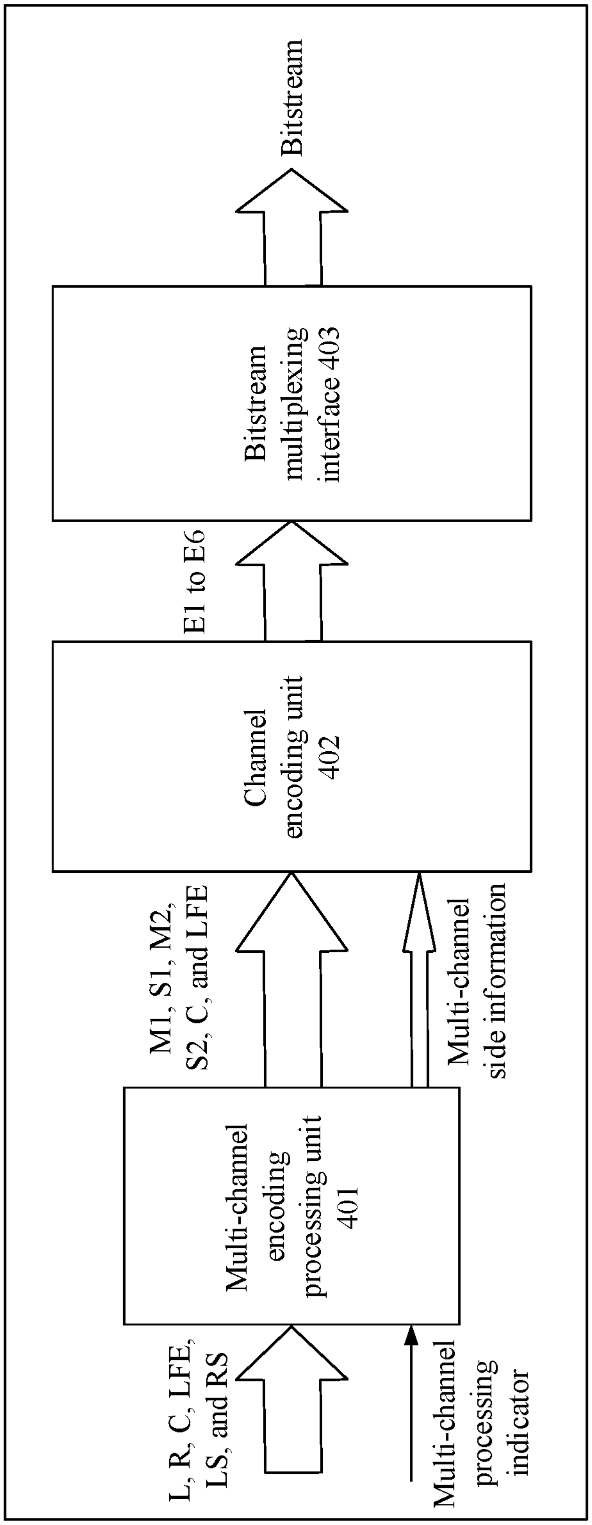
FIG. 4 is a schematic diagram of a processing procedure of an encoder side according to an embodiment of this application.

FIG. 4 is a schematic diagram of a processing procedure of an encoder side according to an embodiment of this application. As shown in FIG. 4, the encoder side may include a multi-channel encoding processing unit 401, a channel encoding unit 402, and a bitstream multiplexing interface 403. The encoder side may be the encoder described above.

The multi-channel encoding processing unit 401 is configured to: perform multi-channel signal screening, coupling, and stereo processing on an input signal; and generate equalization side information and stereo side information. In this embodiment, the input signal is signals of 5.1 channels (an L channel, an R channel, a C channel, an LFE channel, an LS channel, and an RS channel)

In an example, the multi-channel encoding processing unit 401 couples the L channel signal and the R channel signal to form a first channel pair, and performs stereo processing to obtain a middle channel M1 channel signal and a side channel S1 channel signal. The LS channel signal and the RS channel signal are coupled to form a second channel pair, and stereo processing is performed to obtain a middle channel M2 channel signal and a side channel S2 channel signal. For specific description of the multi-channel encoding processing unit 401, refer to the embodiment shown in FIG. 5.

The multi-channel encoding processing unit 401 outputs a stereo processed M1 channel signal, a stereo processed S1 channel signal, a stereo processed M2 channel signal, a stereo processed S2 channel signal, equalization side information, stereo side information, channel pair indexes, and the LFE channel signal and the C channel signal that have not undergone stereo processing.

The channel encoding unit 402 is configured to encode the stereo processed M1 channel signal, the stereo processed S1 channel signal, the stereo processed M2 channel signal, the stereo processed S2 channel signal, multi-channel side information, and the LFE channel signal and the C channel signal that have not undergone stereo processing, to output encoded channels E1 to E6. The multi-channel side information may include the energy/amplitude equalization side information, the stereo side information, and the channel pair indexes. Certainly, it may be understood that the multi-channel side information may further include bit allocation side information, entropy encoded side information, and the like. This is not specifically limited in this embodiment of this application. The channel encoding unit 402 sends the encoded channels E1 to E6 to the bitstream multiplexing interface 403.

The bitstream multiplexing interface 403 multiplexes the six encoded channels E1 to E6 to form a serial bitstream (bitStream), that is, an encoded bitstream, to facilitate transmission of a multi-channel audio signal on a channel or storage of a multi-channel audio signal in a digital medium.

Figure 5:
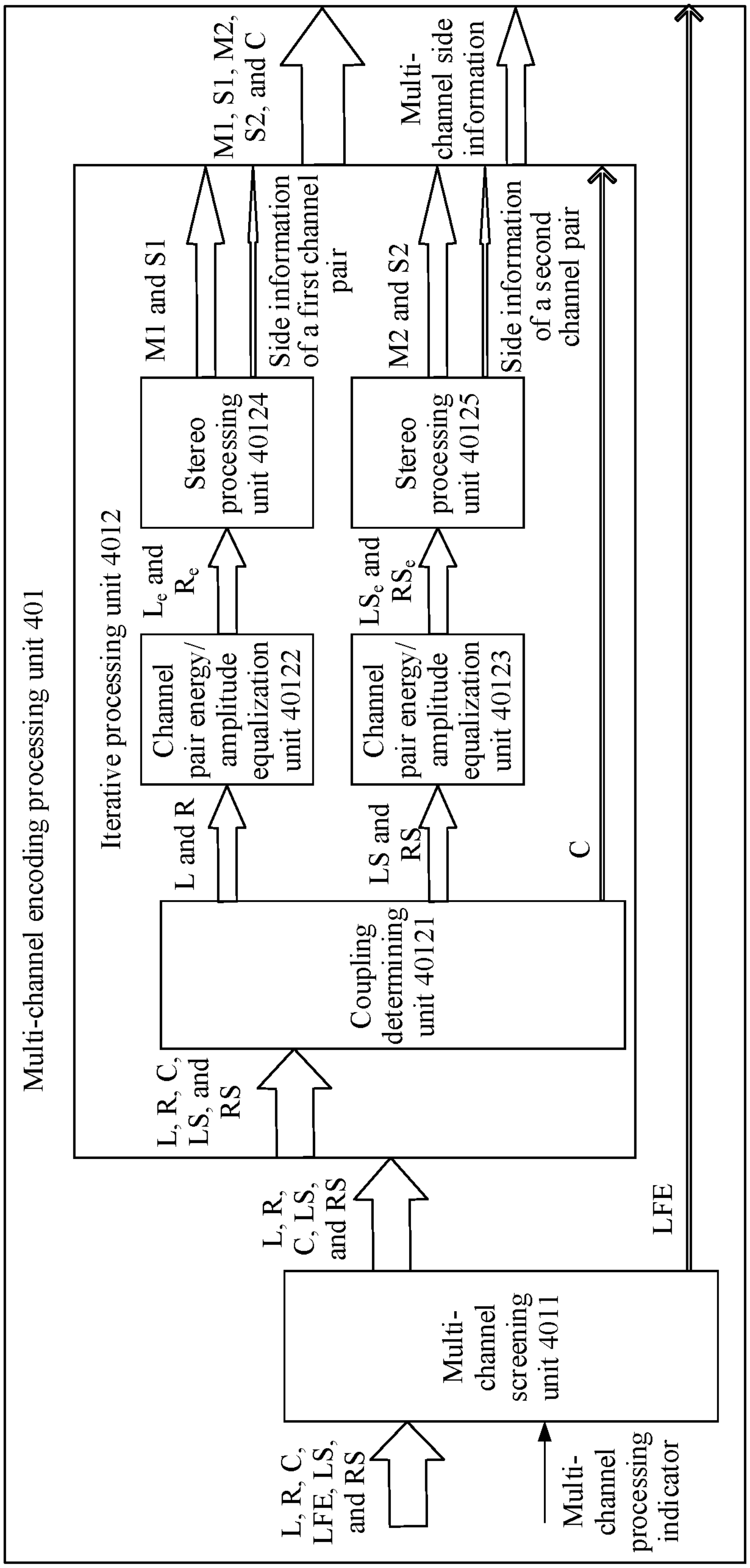
FIG. 5 is a schematic diagram of a processing procedure of a multi-channel encoding processing unit according to an embodiment of this application.

FIG. 5 is a schematic diagram of a processing procedure of a multi-channel encoding processing unit according to an embodiment of this application. As shown in FIG. 5, the multi-channel encoding processing unit 401 may include a multi-channel screening unit 4011 and an iterative processing unit 4012. The iterative processing unit 4012 may include a coupling determining unit 40121, a channel pair equalization unit 40122, a channel pair equalization unit 40123, a stereo processing unit 40124, and a stereo processing unit 40125.

The multi-channel screening unit 4011 obtains, through screening from 5.1 input channels (an L channel, an R channel, a C channel, an LS channel, an RS channel, and an LFE channel) based on a multi-channel processing indicator (MultiProcFlag), channels participating in multi-channel processing: the L channel, the R channel, the C channel, the LS channel, and the RS channel.

The coupling determining unit 40121 in the iterative processing unit 4012 calculates an inter-channel correlation value between each pair of channels in the L channel, the R channel, the C channel, the LS channel, and the RS channel in a first iterative step. In the first iterative step, a channel pair (the L channel, the R channel) with highest inter-channel correlation values is selected from the channels (the L channel, the R channel, the C channel, the LS channel, and the RS channel) to form a first channel pair. The channel pair equalization unit 40122 performs equalization on audio signals of the L channel and the R channel, to obtain audio signals of an $L_e$ channel and an $R_e$ channel. The stereo processing unit 40124 performs stereo processing on the $L_e$ channel and the $R_e$ channel, to obtain side information of the first channel pair, and a middle channel M1 and a side channel S1 that are stereo processed. The side information of the first channel pair includes energy/amplitude equalization side information, stereo side information, and channel indexes of the first channel pair. In a second iterative step, a channel pair (the LS channel, the RS channel) with highest inter-channel correlation values is selected from channels (the C channel, the LS channel, and the RS channel) to form a second channel pair. The equalization unit 40123 performs equalization on the LS channel and the RS channel, to obtain an $LS_e$ channel and an $RS_e$ channel. The stereo processing unit 40125 performs stereo processing on the $LS_e$ channel and the $RS_e$ channel, to obtain side information of the second channel pair, and a middle channel M2 and a side channel S2 that are stereo processed. The side information of the second channel pair includes equalization side information, stereo side information, and channel pair indexes of the second channel pair. The side information of the first channel pair and the side information of the second channel pair constitute multi-channel side information.

The channel pair equalization unit 40122 and the channel pair equalization unit 40123 each average energy/amplitudes of an input channel pair to obtain equalized energy/an equalized amplitude.

For example, the channel pair equalization unit 40122 may determine equalized energy/an equalized amplitude according to the following formula (4):

$$\text{energy\_avg\_pair1}=\text{avg}(\text{energy\_}L,\text{energy\_}R) \tag{4}$$

A function avg($a_1$, $a_2$) is used to output an average value of two parameters $a_1$ and az. energy_L is frame energy/a frame amplitude of the L channel before energy/amplitude equalization, energy_R is frame energy/a frame amplitude of the R channel before equalization, and energy_avg_pair1 is frame energy/a frame amplitude of the first channel pair after equalization.

energy_L and energy_R may be determined according to the foregoing formula (3).

The channel pair equalization unit 40123 may determine equalized energy/an equalized amplitude according to the following formula (4):

$$\text{energy\_avg\_pair2}=\text{avg}(\text{energy\_}LS,\text{energy\_}RS) \tag{5}$$

A function avg($a_1$, $a_2$) is used to output an average value of two parameters $a_1$ and $a_2$. energy_LS is frame energy/a frame amplitude of the LS channel before energy/amplitude equalization, energy_RS is frame energy/a frame amplitude of the RS channel before equalization, and energy_avg_pair2 is energy/an amplitude of the second channel pair after equalization.

In addition, the equalization side information of the first channel pair and the equalization side information of the second channel pair in the foregoing embodiment are generated in an equalization process. The equalization side information of the first channel pair and the equalization side information of the second channel pair are in the encoded bitstream for transmission, to indicate de-equalization of a decoder side.

A manner of determining the equalization side information of the first channel pair is described.

S01: Calculate the energy_avg_pair1, equalized by the channel pair equalization unit 40122, of the first channel pair. energy_avg_pair1 is determined according to the foregoing formula (4).

S02: Calculate a floating-point scaling ratio coefficient of the L channel of the first channel pair.

In an example, the floating-point scaling ratio coefficient of the L channel is scaleF_L. The floating-point scaling ratio coefficient is between (0, 1). If energy_L>energy_$L_e$, scaleF_L=energy_$L_e$/energy_L; or if energy_L≤energy_$L_e$, scaleF_L=energy_L/energy_$L_e$.

energy_$L_e$ is equal to energy_avg_pair1.

S03: Calculate a fixed-point scaling ratio of the L channel of the first channel pair.

In an example, the fixed-point scaling ratio of the L channel is scaleInt_L. A fixed-point quantity of bits from the floating-point scaling ratio coefficient scaleF_L to the fixed-point scaling ratio scaleInt_L is a fixed value. The fixed-point quantity of bits determines precision of conversion from a floating point to a fixed point, and transmission efficiency also needs to be considered (because the side information occupies bits). Herein, it is assumed that the fixed-point quantity of bits is 4 (that is, M=4). In this case, a formula for calculating the fixed-point scaling ratio of the L channel is as follows:

$$scaleInt\_L=ceil((1<<4)\times scaleF\_L)$$

$$scaleInt\_L=clip(scaleInt\_L,1,15)$$

clip((x), (a), (b))=max(a, min(b, (x))), a≤b. A function ceil(x) is a function that rounds up x. A function clip(x, a, b) is a bidirectional clip function that clips x between [a, b].

S04: Calculate an scaling identifier of the L channel of the first channel pair.

In an example, the scaling identifier of the L channel is energyBigFlag_L. If energy_L is greater than energy_$L_e$, energyBigFlag_L is set to 1; or if energy_L is less than or equal to energy_$L_e$, energyBigFlag_L is set to 0.

Details about performing equalization on each coefficient in the L channel in a current frame are as follows:

If energyBigFlag_L is 1, $L_e(i)=L(i)\times scaleInt\_L/(1<<4)$. i is used to identify a coefficient of the current frame, L(i) is an frequency domain coefficient of the current frame before equalization, and $L_e(i)$ is an $i^{th}$ frequency domain coefficient of the current frame after equalization. If energyBigFlag_L is 0, $L_e(i)=L(i)\times(1<<4)/scaleInt\_L$.

Similar operations S01 to S04 may be performed on the R channel of the first channel pair, to obtain a floating-point scaling ratio coefficient scaleF_R, a fixed-point scaling ratio scaleInt_R, and an scaling identifier energyBigFlag_R of the R channel, and a current frame $R_e$ after energy/amplitude equalization. That is, L in S01 to S04 is replaced by R.

Similar operations S01 to S04 may be performed on the LS channel of the second channel pair, to obtain a floating-point scaling ratio coefficient scaleF_LS, a fixed-point scaling ratio scaleInt_LS, an scaling identifier energyBigFlag_LS of the LS channel, and a current frame $LS_e$ after energy/amplitude equalization. That is, L in S01 to S04 is replaced by LS.

Similar operations S01 to S04 are performed on the RS channel of the second channel pair, to obtain a floating-point scaling ratio coefficient scaleF_RS, a fixed-point scaling ratio scaleInt_RS, and an scaling identifier energyBigFlag_RS of the RS channel, and a current frame $RS_e$ after energy/amplitude equalization.

Multi-channel side information is written into an encoded bitstream. The multi-channel side information includes a quantity of channel pairs, the energy/amplitude equalization side information of the first channel pair, a first channel pair index, equalization side information of the second channel pair, and a second channel pair index.

For example, the quantity of channel pairs is currPairCnt, the energy/amplitude equalization side information of the first channel pair and the equalization side information of the second channel pair are a two-dimensional array, and the first channel pair index and the second channel pair index are a one-dimensional array. For example, fixed-point scaling ratios of the first channel pair are PairILDScale[0][0] and PairILDScale[0][1], scaling identifiers of the first channel pair are energyBigFlag[0][0] and energyBigFlag[0][1], fixed-point scaling ratios of the second channel pair are PairILDScale[1][0] and PairILDScale[1][1], and energy/amplitude scaling identifiers of the second channel pair are energyBigFlag[1][0] and energyBigFlag[1][1]. The first channel pair index is PairIndex[0], and the second channel pair index is PairIndex[1].

The quantity of channel pairs currPairCnt may be of a fixed bit length, for example, 4 bits, and may identify a maximum of 16 stereo pairs.

Table 1 shows definitions of values of channel pair indexes PairIndex[pair]. A channel pair index may be length-variable code, is used for transmission in an encoded bitstream, so as to save bits, and is used to restore an audio signal of the decoder side. For example, if PairIndex[0]=0, it indicates that a channel pair includes an R channel and an L channel.

TABLE 1

Channel pair index mapping table of 5 channels

| | 0(L) | 1(R) | 2(C) | 3(LS) | 4(RS) |
|---|---|---|---|---|---|
| 0(L) | | 0 | 1 | 3 | 6 |
| 1(R) | | | 2 | 4 | 7 |
| 2(C) | | | | 5 | 8 |
| 3(LS) | | | | | 9 |
| 4(RS) | | | | | |

In this embodiment, PairILDScale[0][0]=scaleInt_L. PairILDScale[0][1]=scaleInt_R.

PairILDScale[1][0]=scaleInt_LS. PairILDScale[1][1]=scaleInt_RS.

energyBigFlag[0][0]=energyBigFlag_L. energyBigFlag[0][1]=energyBigFlag_R.

energyBigFlag[1][0]=energyBigFlag_LS. energyBigFlag[1][1]=energyBigFlag_RS.

PairIndex[0]=0 (L and R). PairIndex[1]=9 (LS and RS).

Figure 6:
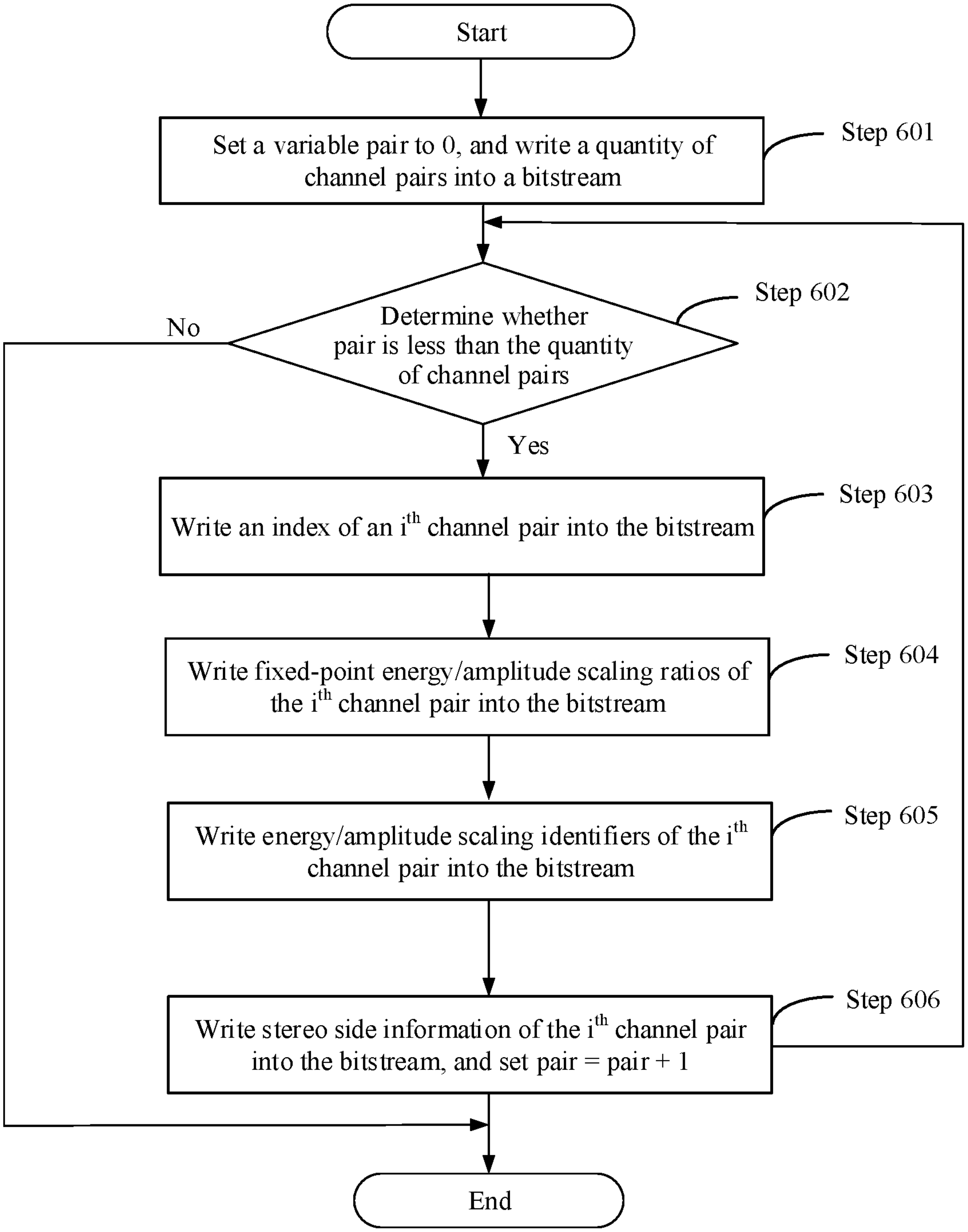
FIG. 6 is a schematic diagram of a multi-channel side information writing procedure according to an embodiment of this application.

For example, FIG. 6 shows a procedure of writing multi-channel side information into a bitstream. Step 601: Set a variable pair to 0, and write a quantity of channel pairs into the bitstream. For example, the quantity of channel pairs currPairCnt may be of 4 bits. Step 602: Determine whether pair is less than the quantity of channel pairs; and if pair is less than the quantity of channel pairs, perform step 603; or if pair is greater than or equal to the quantity of channel pairs, the procedure ends. Step 603: Write an index of an $i^{th}$ channel pair into the bitstream. i=pair+1. For example, PairIndex[0] is written into the bitstream. Step 604: Write fixed-point scaling ratios of the $i^{th}$ channel pair into the bitstream. For example, PairILDScale[0][0] and PairILDScale[0][1] are written into the bitstream. PairILDScale[0][0] and PairILDScale[0][1] each may occupy four bits. Step 605: Write scaling identifiers of the $i^{th}$ channel pair into the bitstream. For example, energyBigFlag[0][0] and energyBigFlag[0][1] are written into the bitstream. energyBigFlag[0][0] and energyBigFlag[0][1] each may occupy one bit. Step 606: Write stereo side information of the $i^{th}$ channel pair into the bitstream, set pair=pair+1, and return to step 602. After step 602 is returned, PairIndex[1], PairILDScale[1][0], PairILDScale[1][1], energyBigFlag[1][0], and energyBigFlag[1][1] are written into the bitstream until the procedure ends.

Figure 7:
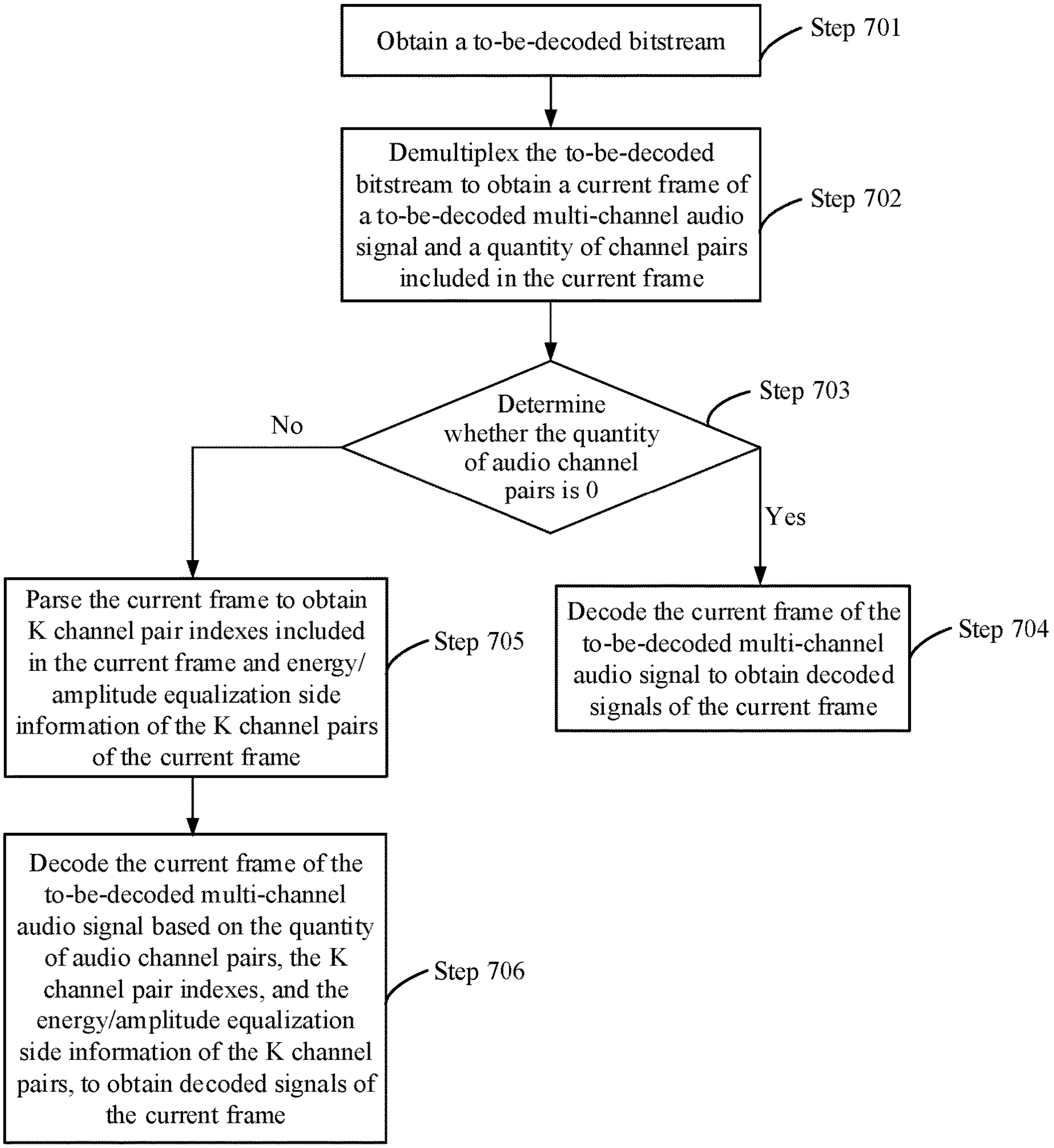
FIG. 7 is a flowchart of a multi-channel audio signal decoding method according to an embodiment of this application.

FIG. 7 is a flowchart of a multi-channel audio signal decoding method according to an embodiment of this application. This embodiment of this application may be performed by the foregoing decoder. As shown in FIG. 7, the method in this embodiment may include the following steps.

Step 701: Obtain a to-be-decoded bitstream.

The to-be-decoded bitstream may be the encoded bitstream obtained in the foregoing encoding method embodiment.

Step 702: Demultiplex the to-be-decoded bitstream to obtain a current frame of a to-be-decoded multi-channel audio signal and a quantity of channel pairs included in the current frame.

Signals of 5.1 channels are used as an example. The to-be-decoded bitstream is demultiplexed to obtain an M1 channel signal, an S1 channel signal, an M2 channel signal, an S2 channel signal, an LFE channel signal, a C channel signal, and a quantity of channel pairs.

Step 703: Determine whether the quantity of channel pairs is equal to 0; and if the quantity of channel pairs is equal to 0, perform step 704; or if the quantity of channel pairs is not equal to 0, perform step 705.

Step 704: Decode the current frame of the to-be-decoded multi-channel audio signal to obtain decoded signals of the current frame.

When the quantity of channel pairs is equal to 0, that is, no channels are coupled, the current frame of the to-be-decoded multi-channel audio signal may be decoded to obtain the decoded signals of the current frame.

Step 705: Parse the current frame to obtain K channel pair indexes included in the current frame and equalization side information of the K channel pairs.

When the quantity of channel pairs is equal to K, the current frame may be further parsed to obtain other control information, for example, K channel pair indexes and equalization side information of the K channel pairs in the current frame, so that de-equalization is performed on the current frame of the to-be-decoded multi-channel audio signal in a subsequent decoding process to obtain the decoded signals of the current frame.

Step 706: Decode the current frame of the to-be-decoded multi-channel audio signal based on the K channel pair indexes and the equalization side information of the K channel pairs, to obtain decoded signals of the current frame.

Signals of 5.1 channels are used as an example. The M1 channel signal, the S1 channel signal, the M2 channel signal, the S2 channel signal, the LFE channel signal, and the C channel signal are decoded to obtain an L channel signal, an R channel signal, an LS channel signal, an RS channel signal, the LFE channel signal, and a C channel signal. In a decoding process, de-equalization is performed based on the energy/amplitude equalization side information of the K channel pairs.

In some embodiments, equalization side information of a channel pair may include fixed-point scaling ratios and scaling identifiers of the channel pair. For specific explanation thereof, refer to explanation in the foregoing encoding embodiment. Details are not described herein again.

In this embodiment, the to-be-decoded bitstream is demultiplexed to obtain the current frame of the to-be-decoded multi-channel audio signal and the quantity of channel pairs included in the current frame. When the quantity of channel pairs is greater than 0, the current frame is further parsed to obtain the K channel pair indexes and equalization side information of the K channel pairs, and the current frame of the to-be-decoded multi-channel audio signal is decoded based on the K channel pair indexes and the energy/amplitude equalization side information of the K channel pairs to obtain the decoded signals of the current frame. A quantity of bits of equalization side information in the encoded bitstream sent by an encoder side and a quantity of bits of multi-channel side information can be reduced because the bitstream does not carry equalization side information of an uncoupled channel. In this way, saved bits can be allocated to another functional module of the encoder, so as to improve quality of a reconstructed audio signal of a decoder side.

Signals of 5.1 channels are used as an example in the following embodiment to describe a multi-channel audio signal decoding method in this embodiment of this application.

Figure 8:
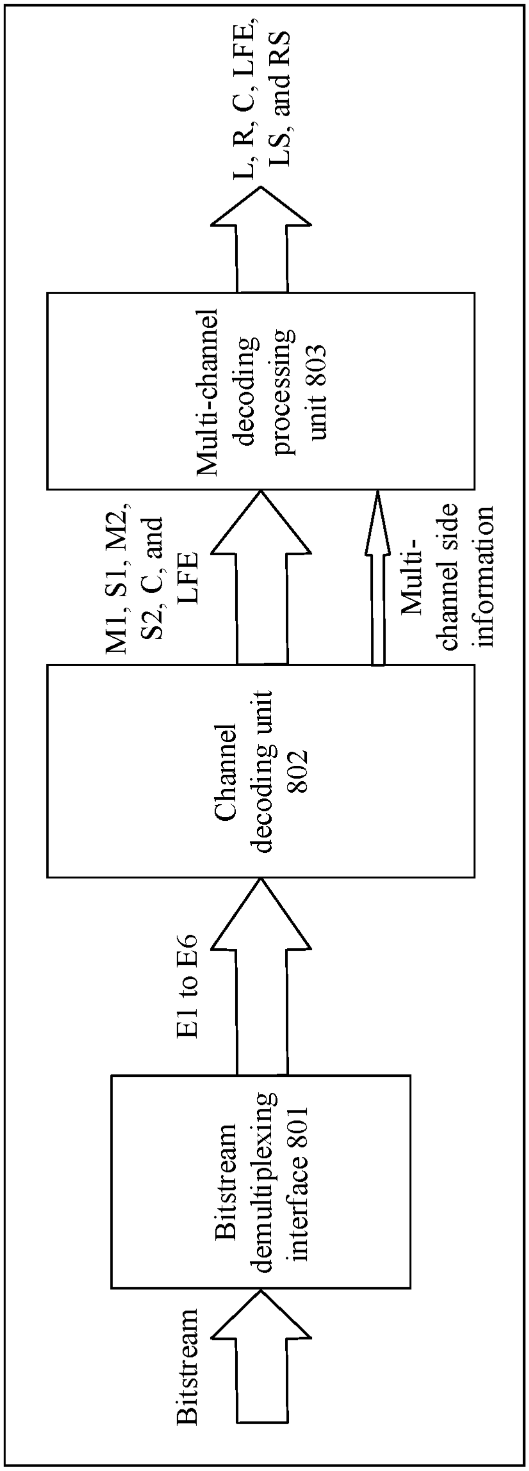
FIG. 8 is a schematic diagram of a processing procedure of a decoder side according to an embodiment of this application.

FIG. 8 is a schematic diagram of a processing procedure of a decoder side according to an embodiment of this application. As shown in FIG. 8, the decoder side may include a bitstream demultiplexing interface 801, a channel decoding unit 802, and a multi-channel decoding processing unit 803. A decoding process in this embodiment is an inverse process of the encoding process in the embodiments shown in FIG. 4 and FIG. 5.

The bitstream demultiplexing interface 801 is configured to demultiplex a bitstream output by an encoder side, to obtain six encoded channels E1 to E6.

The channel decoding unit 802 is configured to perform inverse entropy encoding and inverse quantization on the encoded channels E1 to E6 to obtain a multi-channel signal, including: a middle channel M1 and a side channel S1 of the first channel pair, a middle channel M2 and a side channel S2 of the second channel pair, and a C channel and an LFE channel that are not coupled. The channel decoding unit 802 also performs decoding to obtain multi-channel side information. The multi-channel side information includes side information (for example, entropy encoded side information) generated in the channel encoding processing procedure in the embodiment shown in FIG. 4, and side information generated in the multi-channel encoding processing procedure (for example, equalization side information of the channel pair).

The multi-channel decoding processing unit 803 performs multi-channel decoding processing on the middle channel M1 and the side channel S1 of the first channel pair and the middle channel M2 and the side channel S2 of the second channel pair. The multi-channel side information is used to: decode the middle channel M1 and the side channel S1 of the first channel pair into an L channel and an R channel, and decode the middle channel M2 and the side channel S2 of the second channel pair into an LS channel and an RS channel. The L channel, the R channel, the LS channel, the RS channel, and the uncoupled C channel and LFE channel constitute an output of the decoder side.

Figure 9:
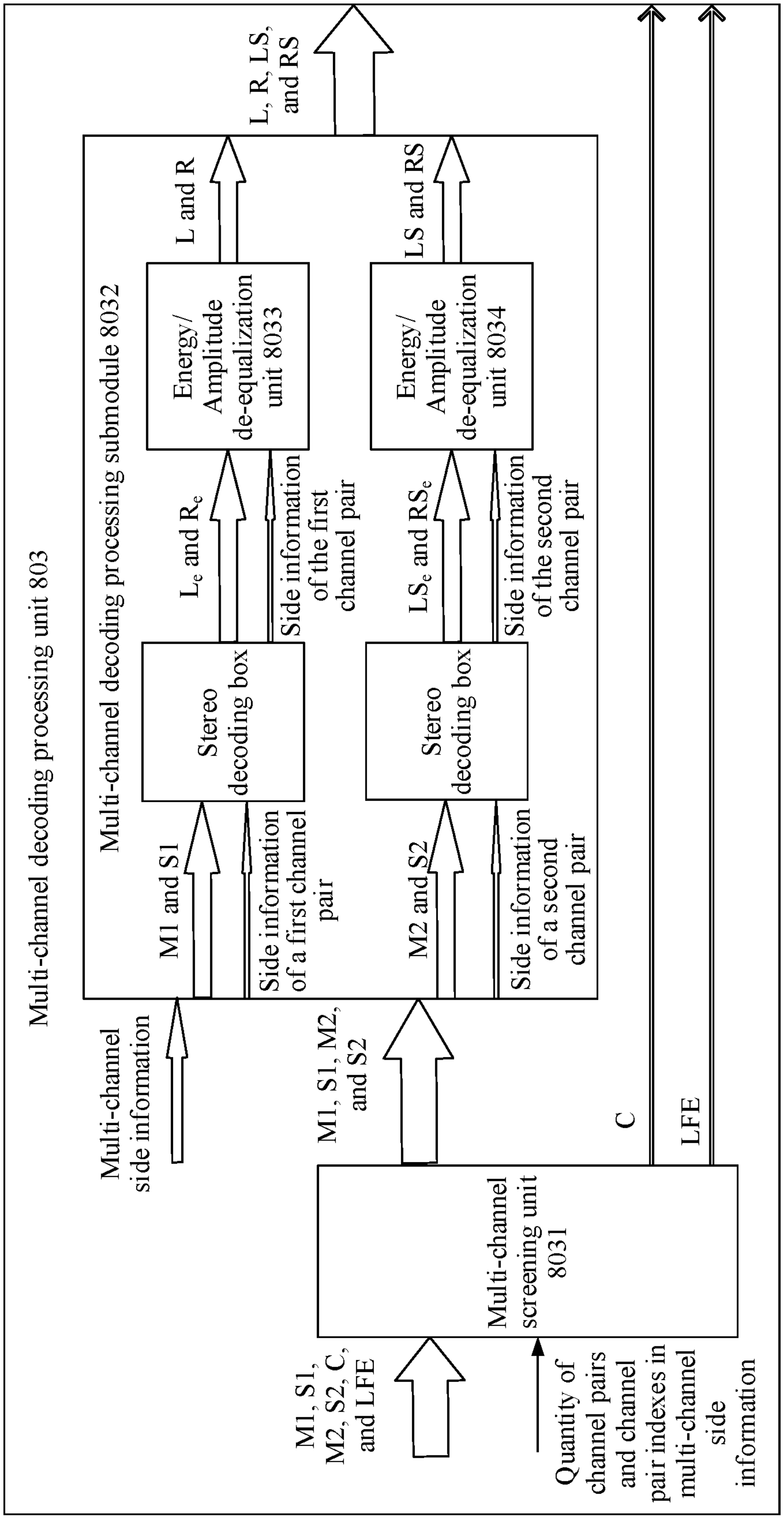
FIG. 9 is a schematic diagram of a processing procedure of a multi-channel decoding processing unit according to an embodiment of this application.

FIG. 9 is a schematic diagram of a processing procedure of a multi-channel decoding processing unit according to an embodiment of this application. As shown in FIG. 9, the multi-channel decoding processing unit 803 may include a multi-channel screening unit 8031 and a multi-channel decoding processing submodule 8032. The multi-channel decoding processing submodule 8032 includes two stereo decoding boxes, an de-equalization unit 8033, and an de-equalization unit 8034.

The multi-channel screening unit 8031 obtains, through screening from 5.1 input channels (an M1 channel, an S1 channel, a C channel, an M2 channel, an S2 channel, and an LFE channel) based on a quantity of channel pairs and channel pair indexes in multi-channel side information, the M1 channel, the S1 channel, the M2 channel, and the S2 channel that participate in multi-channel processing.

A stereo decoding box of the multi-channel decoding processing submodule 8032 is configured to perform the following steps: indicating, based on stereo side information of a first channel pair, that a stereo decoding box decodes the first channel pair (M1, S1) into an $L_e$ channel and an $R_e$ channel; and indicating, based on stereo side information of a second channel pair, that a stereo decoding box decodes the second channel pair (M2, S2) into an $LS_e$ channel and an $RS_e$ channel.

The de-equalization unit 8033 is configured to perform the following step: indicating, based on side information of the first channel pair, that the de-equalization unit de-equalizes energy/an amplitude of the $L_e$ channel and the $R_e$ channel for restoration into an L channel and an R channel. The de-equalization unit 8034 is configured to perform the following step: indicating, based on equalization side information of the second channel pair, that a first channel pair de-equalization unit de-equalizes energy/an amplitude of the $LS_e$ channel and the $RS_e$ channel for restoration an LS channel and an RS channel.

Figure 10:
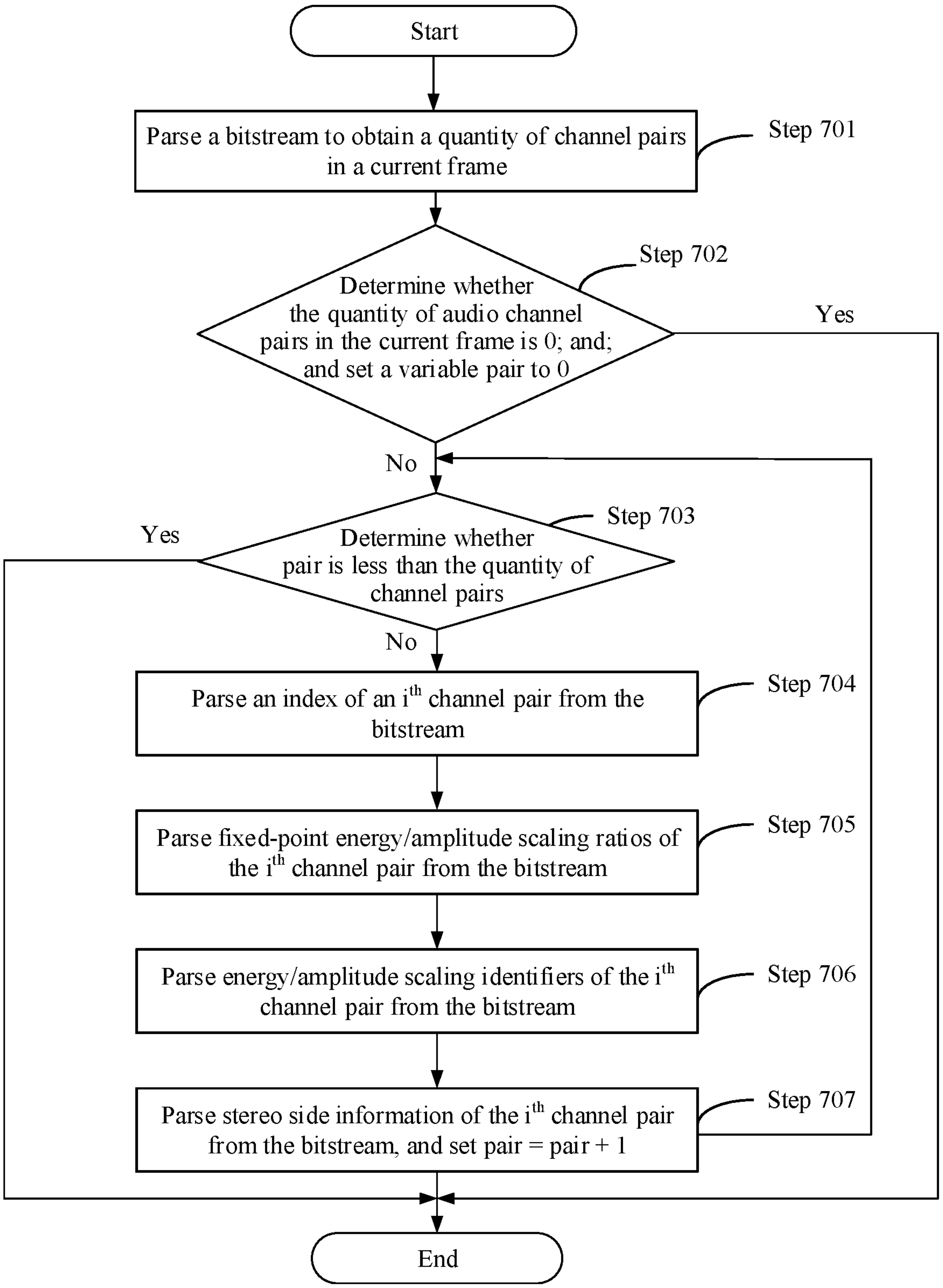
FIG. 10 is a flowchart of parsing multi-channel side information according to an embodiment of this application.

A multi-channel side information decoding process is described. FIG. 10 is a flowchart of parsing multi-channel side information according to an embodiment of this application. This embodiment is an inverse process of the embodiment shown in FIG. 6. As shown in FIG. 10, the method includes the following steps. Step 701: Parse a bitstream to obtain a quantity of channel pairs in a current frame, for example, a quantity of channel pairs currPairCnt, where the quantity of channel pairs currPairCnt occupies four bits in the bitstream. Step 702: Determine whether the quantity of channel pairs in the current frame is 0; and if the quantity of channel pairs in the current frame is 0, the parsing process ends; or if the quantity of channel pairs in the current frame is not 0, perform step 703, where if the quantity of channel pairs currPairCnt in the current frame is 0, it indicates that no coupling is performed in the current frame; in this case, there is no need to obtain equalization side information through parsing; or if the quantity of channel pairs currPairCnt in the current frame is not 0, cyclic parsing is performed for equalization side information of the first channel pair, . . . , and equalization side information of a $(\text{currPairCnt})^{th}$ channel pair. For example, a variable pair is set to 0. In addition, subsequent steps 703 to 707 are performed. Step 703: Determine whether pair is less than the quantity of channel pairs; and if pair is less than the quantity of channel pairs, perform step 704; or if pair is greater than or equal to the quantity of channel pairs, the process ends. Step 704: Parse an index of an $i^{th}$ channel pair from the bitstream, where i=pair+1. Step 705: Parse fixed-point scaling ratios of the $i^{th}$ channel pair from the bitstream, for example, PairILDScale[pair][0] and PairILDScale[pair][1]. Step 706: Parse scaling identifiers of the $i^{th}$ channel pair from the bitstream, for example, energyBigFlag[pair][0] and energyBigFlag[pair][1]. Step 707: Parse stereo side information of the $i^{th}$ channel pair from the bitstream, set pair=pair+1, and return to step 703 until all channel pair indexes, fixed-point scaling ratios, and scaling identifiers are obtained through parsing.

Signals of 5.1 channels (L, R, C, LFE, LS, RS) on an encoder side are used as example to describe a process of parsing side information of a first channel pair and a process of parsing side information of a second channel pair.

The process of parsing the side information of the first channel pair is as follows: A 4-bit channel pair index PairIndex[0] is parsed from a bitstream, and is mapped into an L channel and an R channel according to a definition rule of a channel pair index. A fixed-point scaling ratio PairILDScale[0][0] of the L channel and a fixed-point scaling ratio PairILDScale[0][1] of the R channel are parsed from the bitstream. An scaling identifier energyBigFlag[0][0] of the L channel and an scaling identifier energyBigFlag[0][1] of the R channel are parsed from the bitstream. Stereo side information of the first channel pair is parsed from the bitstream. Parsing of the side information of the first channel pair is completed.

The process of parsing the side information of the second channel pair is as follows: A 4-bit channel pair index PairIndex[1] is parsed from the bitstream, and is mapped into an LS channel and an RS channel according to a definition rule of a channel pair index. A fixed-point scaling ratio PairILDScale[1][0] of the LS channel and a fixed-point scaling ratio PairILDScale[1][1] of the RS channel are parsed from the bitstream. An scaling identifier energyBigFlag[1][0] of the LS channel and an scaling identifier energyBigFlag[1][1] of the RS channel are parsed from the bitstream. Stereo side information of the second channel pair is parsed from the bitstream. Parsing of the side information of the second channel pair is completed.

A process in which the de-equalization unit 8033 is configured to de-equalize energy/an amplitude of the $L_e$ channel and the $R_e$ channel of the first channel pair is as follows:

A floating-point scaling ratio coefficient scaleF_L of the L channel is calculated based on the fixed-point scaling ratio PairILDScale[0][0] of the L channel and the scaling identifier energyBigFlag[0][0] of the L channel. If the scaling identifier energyBigFlag[0][0] of the L channel is 1, scaleF_L=(1<<4)/PairILDScale[0][0]; or if the scaling identifier energyBigFlag[0][0] of the L channel is 0, scaleF_L=PairILDScale[0][0]/(1 «4).

A frequency domain coefficient of an L channel after de-equalization is obtained based on the floating-point scaling ratio coefficient scaleF_L of the L channel. $L(i)=L_e(i)\times$ scaleF_L, where i is used to identify a coefficient of a current frame, L(i) is an $i^{th}$ frequency domain coefficient of the current frame before equalization, and $L_e(i)$ is an $i^{th}$ frequency domain coefficient of the current frame after equalization.

A floating-point scaling ratio coefficient scaleF_R of an R channel is calculated based on the fixed-point scaling ratio PairILDScale[0][1] of the R channel and the scaling identifier energyBigFlag[0][1] of the R channel. If the scaling identifier energyBigFlag[0][1] of the R channel is 1, scaleF_R=(1<<4)/PairILDScale[0][1]; or if the scaling identifier energyBigFlag[0][1] of the R channel is 0, scaleF_R=PairILDScale[0][1]/(1<<4).

A frequency domain coefficient of an R channel after de-equalization is obtained based on the floating-point scaling ratio coefficient scaleF_R of the R channel. $R(i)=R_e(i)\times$ scaleF_R, where i is used to identify a coefficient of a current frame, R(i) is an $i^{th}$ frequency domain coefficient of the current frame before equalization, and $L_e(i)$ is an $i^{th}$ frequency domain coefficient of the current frame after equalization.

A specific implementation in which the de-equalization unit 8034 is configured to de-equalize energy/amplitudes of the $LS_e$ channel and the $RS_e$ channel of the second channel pair is consistent with an implementation of de-equalizing the energy/amplitudes of the $L_e$ channel and the $R_e$ channel of the first channel pair. Details are not described herein again.

An output of the multi-channel decoding processing unit 803 is a decoded L channel signal, R channel signal, LS channel signal, RS channel signal, C channel signal, and LFE channel signal.

In this embodiment, a quantity of bits of equalization side information in the encoded bitstream sent by the encoder side and a quantity of bits of multi-channel side information can be reduced because the bitstream does not carry energy/amplitude equalization side information of an uncoupled channel. In this way, saved bits can be allocated to another functional module of the encoder, so as to improve quality of a reconstructed audio signal of a decoder side.

Based on the same inventive idea as the foregoing method, an embodiment of this application further provides an audio signal encoding apparatus. The audio signal encoding apparatus may be used in an audio encoder.

Figure 11:
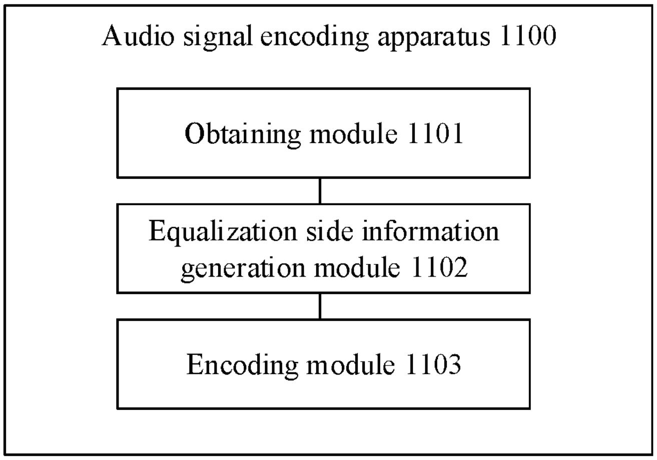
FIG. 11 is a schematic diagram of a structure of an audio signal encoding apparatus 1100 according to an embodiment of this application.

FIG. 11 is a schematic diagram of a structure of an audio signal encoding apparatus according to an embodiment of this application. As shown in FIG. 11, the audio signal encoding apparatus 1100 includes an obtaining module 1101, an equalization side information generation module 1102, and an encoding module 1103.

The obtaining module 1101 is configured to obtain audio signals of P channels in a current frame of a multi-channel audio signal and respective energy/amplitudes of the audio signals of the P channels, where P is a positive integer greater than 1, the P channels include K channel pairs, each channel pair includes two channels, K is a positive integer, and P is greater than or equal to K×2.

The equalization side information generation module 1102 is configured to generate equalization side information of the K channel pairs based on the respective energy/amplitudes of the audio signals of the P channels.

The encoding module 1103 is configured to encode the energy/amplitude equalization side information of the K channel pairs and the audio signals of the P channels, to obtain an encoded bitstream.

In some embodiments, the K channel pairs include a current channel pair, and the equalization side information of the current channel pair includes fixed-point scaling ratios and scaling identifiers of the current channel pair. The fixed-point scaling ratio is a fixed-point value of an scaling ratio coefficient, the scaling ratio coefficient is obtained based on respective energy/amplitudes of audio signals of two channels of the current channel pair before equalization and respective energy/amplitudes of the audio signals of the two channels after equalization, the energy/amplitude scaling identifier is used to identify that the respective energy/amplitudes of the audio signals of the two channels of the current channel pair after equalization is or are increased or decreased relative to the respective energy/amplitudes of the audio signals before equalization.

In some embodiments, the K channel pairs include the current channel pair, and the equalization side information generation module 1102 is configured to: determine, based on the respective energy/amplitudes of the audio signals of the two channels of the current channel pair before equalization, the respective energy/amplitudes of the audio signals of the two channels of the current channel pair after equalization; and generate the equalization side information of the current channel pair based on the respective energy/amplitudes of the audio signals of the two channels of the current channel pair before equalization and the respective energy/amplitudes of the audio signals of the two channels after equalization.

In some embodiments, the current channel pair includes a first channel and a second channel, and the equalization side information of the current channel pair includes a fixed-point scaling ratio of the first channel, a fixed-point scaling ratio of the second channel, an scaling identifier of the first channel, and an scaling identifier of the second channel.

In some embodiments, the equalization side information generation module 1102 is configured to: determine an scaling ratio coefficient of an audio signal of a $q^{th}$ channel of the current channel pair based on energy/an amplitude of an audio signal of the $q^{th}$ channel before equalization and energy/an amplitude of the audio signal of the $q^{th}$ channel after equalization; determine a fixed-point scaling ratio of the $q^{th}$ channel based on the scaling ratio coefficient of the $q^{th}$ channel; and determine an scaling identifier of the $q^{th}$ channel based on the of the audio signal of the $q^{th}$ channel before equalization and the of the audio signal of the $q^{th}$ channel after equalization, where q is 1 or 2.

In some embodiments, the equalization side information generation module 1102 is configured to: determine an average value of the audio signals of the current channel pair based on the respective energy/amplitudes of the audio signals of the two channels of the current channel pair before equalization; and determine, based on the average value of the audio signals of the current channel pair, the respective energy/amplitudes of the audio signals of the two channels of the current channel pair after equalization.

In some embodiments, the encoding module 1103 is configured to encode the equalization side information of the K channel pairs, K, respective channel pair indexes of the K channel pairs, and the audio signals of the P channels, to obtain the encoded bitstream.

It should be noted that the obtaining module 1101, the equalization side information generation module 1102, and the encoding module 1103 may be used in an audio signal encoding process on an encoder side.

It should be further noted that, for a specific implementation process of the obtaining module 1101, the equalization side information generation module 1102, and the encoding module 1103, refer to the detailed description of the encoding method in the foregoing method embodiment. For brevity of the specification, details are not described herein again.

Based on a same inventive idea as the foregoing method, an embodiment of this application provides an audio signal encoder. The audio signal encoder is configured to encode an audio signal, and includes, for example, the encoder described in the foregoing one or more embodiments. The audio signal encoding apparatus is configured to perform encoding to generate a corresponding bitstream.

Figure 12:
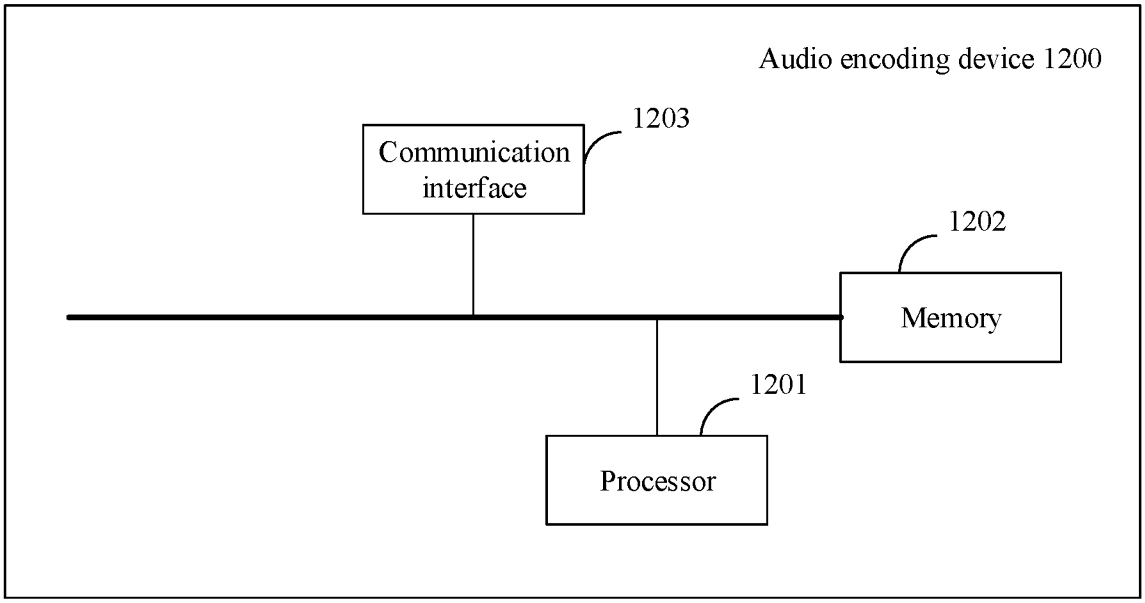
FIG. 12 is a schematic diagram of a structure of an audio signal encoding device 1200 according to an embodiment of this application.

Based on the same inventive idea as the foregoing method, an embodiment of this application provides a device for encoding an audio signal, for example, an audio signal encoding device. As shown in FIG. 12, an audio signal encoding device 1200 includes:

a processor 1201, a memory 1202, and a communication interface 1203 (there may be at least one processor 1201 in the audio signal encoding device 1200, and FIG. 12 uses an example of one processor). In some embodiments of this application, the processor 1201, the memory 1202, and the communication interface 1203 may be connected through a bus or in another manner. FIG. 12 shows an example of connection through a bus.

The memory 1202 may include a read-only memory and a random access memory, and provide instructions and data for the processor 1201. A part of the memory 1202 may further include a non-volatile random access memory (NVRAM). The memory 1202 stores an operating system and operation instructions, an executable module or a data structure, or a subset thereof, or an extended set thereof. The operation instructions may include various operation instructions for performing various operations. The operating system may include various system programs, to implement various basic services and process a hardware-based task.

The processor 1201 controls an operation of the audio encoding device, and the processor 1201 may also be referred to as a central processing unit (CPU). In specific application, components of the audio encoding device are coupled together by using a bus system. In addition to a data bus, the bus system may further include a power bus, a control bus, a status signal bus, and the like. However, for clear description, various types of buses in the figure are marked as the bus system.

The method disclosed in embodiments of this application may be applied to the processor 1201, or may be implemented by the processor 1201. The processor 1201 may be an integrated circuit chip, and has a signal processing capability. In an implementation process, each step in the foregoing methods may be performed by using a hardware integrated logical circuit in the processor 1201 or an instruction in a form of software. The processor 1201 may be a general-purpose processor, a digital signal processor (DSP), an application-specific integrated circuit (ASIC), a field-programmable gate array (FPGA) or another programmable logic device, a discrete gate or transistor logic device, or a discrete hardware component. The processor 1201 may implement or perform the methods, the steps, and logical block diagrams that are disclosed in embodiments of this application. The general-purpose processor may be a microprocessor, or the processor may be any conventional processor or the like. The steps of the methods disclosed with reference to embodiments of this application may be directly executed and accomplished by using a hardware decoding processor, or may be executed and accomplished by using a combination of hardware and software modules in a decoding processor. A software module may be located in a storage medium mature in the art, such as a random access memory, a flash memory, a read-only memory, a programmable read-only memory, an electrically erasable programmable memory, or a register. The storage medium is located in the memory 1202, and the processor 1201 reads information in the memory 1202 and completes the steps of the foregoing method in combination with the hardware of the processor 1201.

The communication interface 1203 may be configured to receive or send digit or character information, for example, may be an input/output interface, a pin, or a circuit. For example, the foregoing encoded bitstream is sent through the communication interface 1203.

Based on the same inventive idea as the foregoing method, an embodiment of this application provides an audio encoding device, including a non-volatile memory and a processor that are coupled to each other. The processor invokes program code stored in the memory, to perform a part or all of the steps in the multi-channel audio signal encoding method in one or more of the foregoing embodiments.

Based on the same inventive idea as the foregoing method, an embodiment of this application provides a computer-readable storage medium. The computer-readable storage medium stores program code, and the program code includes instructions for performing a part or all of the steps in the multi-channel audio signal encoding method in one or more of the foregoing embodiments.

Based on the same inventive idea as the foregoing method, an embodiment of this application provides a computer program product. When the computer program product runs on a computer, the computer is enabled to perform a part or all of the steps in the multi-channel audio signal encoding method in one or more of the foregoing embodiments.

Based on the same inventive idea as the foregoing method, an embodiment of this application further provides an audio signal decoding apparatus. The audio signal decoding apparatus may be used in an audio decoder.

Figure 13:
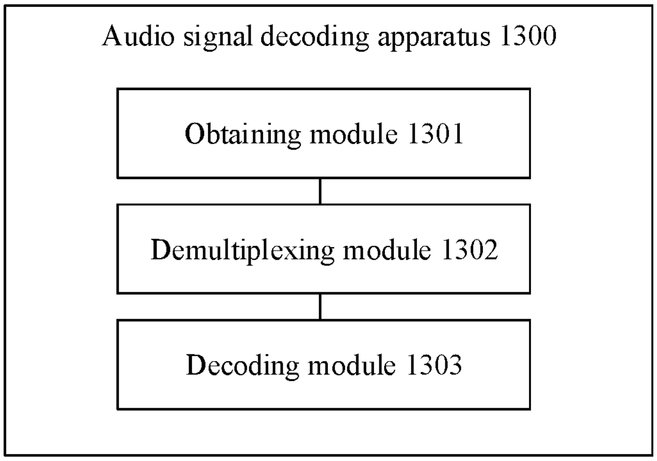
FIG. 13 is a schematic diagram of a structure of an audio signal decoding apparatus 1300 according to an embodiment of this application.

FIG. 13 is a schematic diagram of a structure of an audio signal decoding apparatus according to an embodiment of this application. As shown in FIG. 13, the audio signal decoding apparatus 1300 includes an obtaining module 1301, a demultiplexing module 1302, and a decoding module 1303.

The obtaining module 1301 is configured to obtain a to-be-decoded bitstream.

The demultiplexing module 1302 is configured to demultiplex the to-be-decoded bitstream to obtain a current frame of a to-be-decoded multi-channel audio signal, a quantity K of channel pairs included in the current frame, respective channel pair indexes of the K channel pairs, and equalization side information of the K channel pairs.

The decoding module 1303 is configured to decode the current frame of the to-be-decoded multi-channel audio signal based on the respective channel pair indexes of the K channel pairs and the equalization side information of the K channel pairs, to obtain decoded signals of the current frame, where K is a positive integer, and each channel pair includes two channels.

In some embodiments, the K channel pairs include a current channel pair, and the equalization side information of the current channel pair includes fixed-point scaling ratios and scaling identifiers of the current channel pair. The fixed-point scaling ratio is a fixed-point value of an scaling ratio coefficient, the scaling ratio coefficient is obtained based on respective energy/amplitudes of audio signals of two channels of the current channel pair before equalization and respective energy/amplitudes of the audio signals of the two channels after equalization, the energy/amplitude scaling identifier is used to identify that the respective energy/amplitudes of the audio signals of the two channels of the current channel pair after equalization is or are increased or decreased relative to the respective energy/amplitudes of the audio signals before equalization.

In some embodiments, the K channel pairs include the current channel pair, and the decoding module 1303 is configured to: perform stereo decoding processing on the current frame of the to-be-decoded multi-channel audio signal based on a channel pair index corresponding to the current channel pair, to obtain the audio signals of the two channels of the current channel pair of the current frame; and perform de-equalization processing on the audio signals of the two channels of the current channel pair based on the equalization side information of the current channel pair, to obtain decoded signals of the two channels of the current channel pair.

In some embodiments, the current channel pair includes a first channel and a second channel, and the equalization side information of the current channel pair includes a fixed-point scaling ratio of the first channel, a fixed-point scaling ratio of the second channel, an scaling identifier of the first channel, and an scaling identifier of the second channel.

It should be noted that the obtaining module 1301, the demultiplexing module 1302, and the decoding module 1303 may be used in an audio signal decoding process on a decoder side.

It should be further noted that, for a specific implementation process of the obtaining module 1301, the demultiplexing module 1302, and the decoding module 1303, refer to the detailed description of the decoding method in the foregoing method embodiment. For brevity of the specification, details are not described herein again.

Based on the same inventive idea as the foregoing method, an embodiment of this application provides an audio signal decoder. The audio signal decoder is configured to decode an audio signal, and includes, for example, the decoder described in one or more of the foregoing embodiments. An audio signal decoding apparatus is configured to perform decoding to generate a corresponding bitstream.

Figure 14:
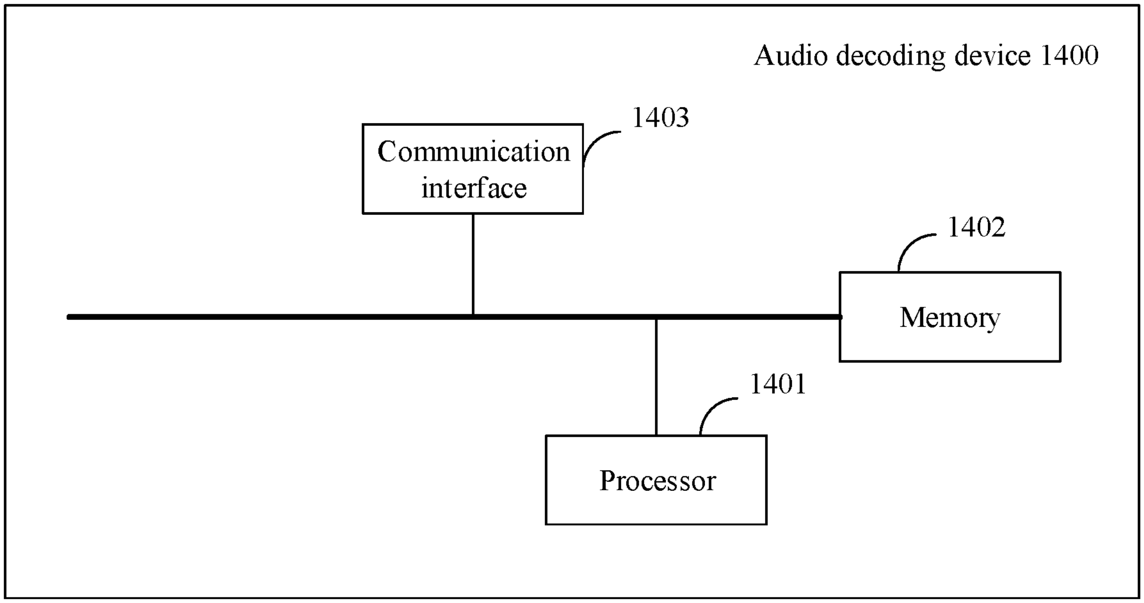
FIG. 14 is a schematic diagram of a structure of an audio signal decoding device 1400 according to an embodiment of this application.

Based on the same inventive idea as the foregoing method, an embodiment of this application provides a device for decoding an audio signal, for example, an audio signal decoding device. As shown in FIG. 14, an audio signal decoding device 1400 includes:

a processor 1401, a memory 1402, and a communication interface 1403 (there may be at least one processor 1401 in the audio signal decoding device 1400, and FIG. 14 uses an example of one processor). In some embodiments of this application, the processor 1401, the memory 1402, and the communication interface 1403 may be connected through a bus or in another manner. FIG. 14 shows an example of connection through a bus.

The memory 1402 may include a read-only memory and a random access memory, and provide instructions and data for the processor 1401. A part of the memory 1402 may further include a non-volatile random access memory (NVRAM). The memory 1402 stores an operating system and operation instructions, an executable module or a data structure, or a subset thereof, or an extended set thereof. The operation instructions may include various operation instructions for performing various operations. The operating system may include various system programs, to implement various basic services and process a hardware-based task.

The processor 1401 controls an operation of an audio decoding device, and the processor 1401 may also be referred to as a central processing unit (CPU). In specific application, components of the audio decoding device are coupled together by using a bus system. In addition to a data bus, the bus system may further include a power bus, a control bus, a status signal bus, and the like. However, for clear description, various types of buses in the figure are marked as the bus system.

The method disclosed in embodiments of this application may be applied to the processor 1401, or may be implemented by the processor 1401. The processor 1401 may be an integrated circuit chip, and has a signal processing capability. In an implementation process, each step in the foregoing methods may be performed by using a hardware integrated logical circuit in the processor 1401 or an instruction in a form of software. The processor 1401 may be a general-purpose processor, a digital signal processor (DSP), an application-specific integrated circuit (ASIC), a field-programmable gate array (FPGA) or another programmable logic device, a discrete gate or transistor logic device, or a discrete hardware component. The processor 1401 may implement or perform the methods, the steps, and logical block diagrams that are disclosed in embodiments of this application. The general-purpose processor may be a microprocessor, or the processor may be any conventional processor or the like. The steps of the methods disclosed with reference to embodiments of this application may be directly executed and accomplished by using a hardware decoding processor, or may be executed and accomplished by using a combination of hardware and software modules in a decoding processor. A software module may be located in a storage medium mature in the art, such as a random access memory, a flash memory, a read-only memory, a programmable read-only memory, an electrically erasable programmable memory, or a register. The storage medium is located in the memory 1402, and the processor 1401 reads information in the memory 1402 and completes the steps of the foregoing method in combination with the hardware of the processor 1401.

The communication interface 1403 may be configured to receive or send digit or character information, for example, may be an input/output interface, a pin, or a circuit. For example, the foregoing encoded bitstream is received through the communication interface 1403.

Based on the same inventive idea as the foregoing method, an embodiment of this application provides an audio decoding device, including a non-volatile memory and a processor that are coupled to each other. The processor invokes program code stored in the memory, to perform a part or all of the steps in the multi-channel audio signal decoding method in one or more of the foregoing embodiments.

Based on the same inventive idea as the foregoing method, an embodiment of this application provides a computer-readable storage medium. The computer-readable storage medium stores program code, and the program code includes instructions for performing a part or all of the steps in the multi-channel audio signal decoding method in one or more of the foregoing embodiments.

Based on the same inventive idea as the foregoing method, an embodiment of this application provides a computer program product. When the computer program product runs on a computer, the computer is enabled to perform a part or all of the steps in the multi-channel audio signal decoding method in one or more of the foregoing embodiments.

The processor mentioned in the foregoing embodiments may be an integrated circuit chip, and has a signal processing capability. In an implementation process, each step in the foregoing method embodiments may be performed by using a hardware integrated logical circuit in the processor or an instruction in a form of software. The processor may be a general-purpose processor, a digital signal processor (DSP), an application-specific integrated circuit (ASIC), a field programmable gate array (FPGA) or another programmable logic device, a discrete gate or transistor logic device, or a discrete hardware component. The general-purpose processor may be a microprocessor, or the processor may be any conventional processor or the like. The steps of the methods disclosed in embodiments of this application may be directly executed and accomplished by using a hardware encoding processor, or may be executed and accomplished by a combination of hardware and a software module in an encoding processor. A software module may be located in a storage medium mature in the art, such as a random access memory, a flash memory, a read-only memory, a programmable read-only memory, an electrically erasable programmable memory, or a register. The storage medium is located in the memory, and the processor reads information in the memory and completes the steps of the foregoing method in combination with the hardware of the processor.

The memory in the foregoing embodiments may be a volatile memory or a non-volatile memory, or may include both a volatile memory and a non-volatile memory. The non-volatile memory may be a read-only memory (ROM), a programmable read-only memory (PROM), an erasable programmable read-only memory (EPROM), an electrically erasable programmable read-only memory (EEPROM), or a flash memory. The volatile memory may be a random access memory (RAM), used as an external cache. Through example but not limitative description, many forms of RAMs may be used, for example, a static random access memory (SRAM), a dynamic random access memory (DRAM), a synchronous dynamic random access memory (SDRAM), a double data rate synchronous dynamic random access memory (DDR SDRAM), an enhanced synchronous dynamic random access memory (ESDRAM), a synchronous link dynamic random access memory (SLDRAM), and a direct rambus dynamic random access memory (DR RAM). It should be noted that the memory in the system and method described in this specification includes, but is not limited to, these and any memory of another proper type.

A person of ordinary skill in the art may be aware that, in combination with the examples described in embodiments disclosed in this specification, units and algorithm steps can be implemented by electronic hardware or a combination of computer software and electronic hardware. Whether the functions are performed by hardware or software depends on particular applications and design constraints of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiments. Details are not described herein again.

In the several embodiments provided in this application, it should be understood that, the disclosed system, apparatus, and method may be implemented in other manners. For example, the described apparatus embodiments are merely examples. For example, division into the units is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electrical, mechanical, or other forms.

The units described as separate parts may or may not be physically separate, and parts displayed as units may or may not be physical units, may be located in one position, or may be distributed on a plurality of network units. A part or all of the units may be selected based on actual requirements to achieve the objectives of the solutions of embodiments.

In addition, functional units in embodiments of this application may be integrated into one processing unit, each of the units may exist alone physically, or two or more units may be integrated into one unit.

When the functions are implemented in the form of a software functional unit and sold or used as an independent product, the functions may be stored in a computer-readable storage medium. Based on such an understanding, the technical solutions of this application essentially, or the part contributing to the prior art, or some of the technical solutions may be implemented in a form of a software product. The computer software product is stored in a storage medium, and includes several instructions for instructing a computer device (which may be a personal computer, a server, a network device, or the like) to perform all or a part of the steps of the methods described in embodiments of this application. The foregoing storage medium includes any medium that can store program code, such as a USB flash drive, a removable hard disk, a read-only memory (ROM), a random access memory (RAM), a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A multi-channel audio signal encoding method, comprising:

obtaining audio signals of P channels in a current frame of a multi-channel audio signal, wherein P is a positive integer greater than 1, the P channels comprise K channel pairs, each channel pair comprises two channels, K is a positive integer, and P is greater than or equal to K×2;

obtaining respective energy or amplitudes of the audio signals of the P channels;

generating energy or amplitude equalization side information of the K channel pairs based on the respective energy or amplitudes of the audio signals of the P channels, including determining, based on respective energy or amplitudes of the audio signals of two channels of a current channel pair before energy or amplitude equalization, respective energy or amplitudes of the audio signals of the two channels of the current channel pair after energy or amplitude equalization;

generating the energy or amplitude equalization side information of the current channel pair based on the respective energy or amplitudes of the audio signals of the two channels of the current channel pair before energy or amplitude equalization and the respective energy or amplitudes of the audio signals of the two channels after energy or amplitude equalization;

wherein the K channel pairs comprise the current channel pair; and encoding the energy or amplitude equalization side information of the K channel pairs and the audio signals of the P channels to obtain an encoded bitstream.

2. The method according to claim 1, wherein the K channel pairs comprise a current channel pair, and energy or amplitude equalization side information of the current channel pair comprises:

fixed-point energy or amplitude scaling ratios and energy or amplitude scaling identifiers of the current channel pair, wherein the fixed-point energy or amplitude scaling ratio is a fixed-point value of an energy or amplitude scaling ratio coefficient, the energy or amplitude scaling ratio coefficient is obtained based on respective energy or amplitudes of audio signals of the two channels of the current channel pair before energy or amplitude equalization and respective energy or amplitudes of the audio signals of the two channels after energy or amplitude equalization, the energy or amplitude scaling identifier is used to identify that the respective energy or amplitude of the audio signals of the two channels of the current channel pair after energy or amplitude equalization is one of increased or decreased relative to the respective energy or amplitudes of the audio signals before energy or amplitude equalization.

3. The method according to claim 1, wherein the generating energy or amplitude equalization side information of the K channel pairs based on the respective energy or amplitudes of the audio signals of the P channels comprises: generating the energy or amplitude equalization side information of the current channel pair based on the respective energy or amplitudes of the audio signals of the two channels of the current channel pair before energy or amplitude equalization.

4. The method according to claim 3, wherein the current channel pair comprises a first channel and a second channel, and the energy or amplitude equalization side information of the current channel pair comprises:

a fixed-point energy or amplitude scaling ratio and an energy or amplitude scaling identifier of the first channel, and a fixed-point energy or amplitude scaling ratio and an energy or amplitude scaling identifier of the second channel.

5. The method according to claim 4, wherein the generating the energy or amplitude equalization side information of the current channel pair based on the respective energy or amplitudes of the audio signals of the two channels of the current channel pair before energy or amplitude equalization and the respective energy or amplitudes of the audio signals of the two channels after energy or amplitude equalization comprises:

determining an energy or amplitude scaling ratio coefficient of a $q^{th}$ channel of the current channel pair and an energy or amplitude scaling identifier of the $q^{th}$ channel based on energy or amplitude of an audio signal of the $q^{th}$ channel before energy or amplitude equalization and energy or amplitude of the audio signal of the $q^{th}$ channel after energy or amplitude equalization; and determining a fixed-point energy or amplitude scaling ratio of the $q^{th}$ channel based on the energy or amplitude scaling ratio coefficient of the $q^{th}$ channel, wherein q is one of 1 or 2.

6. The method according to claim 3, wherein the determining, based on the respective energy or amplitudes of the audio signals of the two channels of the current channel pair before energy or amplitudes equalization, the respective energy or amplitudes of the audio signals of the two channels of the current channel pair after energy or amplitude equalization comprises:

determining an average energy or amplitude value of the audio signals of the current channel pair based on the respective energy or amplitudes of the audio signals of the two channels of the current channel pair before energy or amplitude equalization; and determining, based on the average energy or amplitude value of the audio signals of the current channel pair, the respective energy or amplitudes of the audio signals of the two channels of the current channel pair after energy or amplitude equalization.

7. The method according to claim 1, wherein the encoding the energy or amplitude equalization side information of the K channel pairs and the audio signals of the P channels to obtain an encoded bitstream comprises:

encoding the energy or amplitude equalization side information of the K channel pairs, K, respective channel pair indexes of the K channel pairs, and the audio signals of the P channels, to obtain the encoded bitstream.

8. A multi-channel audio signal decoding method, comprising:

obtaining a to-be-decoded bitstream;

demultiplexing the to-be-decoded bitstream to obtain a current frame of a to-be-decoded multi-channel audio signal, a quantity K of channel pairs comprised in the current frame, respective channel pair indexes of the K channel pairs, and energy or amplitude equalization side information of the K channel pairs, wherein K is a positive integer, and each channel pair comprises two channels, wherein the K channel pairs comprise a current channel pair;

decoding the current frame of the to-be-decoded multichannel audio signal based on the respective channel pair indexes of the K channel pairs and the energy or amplitude equalization side information of the K channel pairs, to obtain decoded signals of the current frame, including:

performing stereo decoding processing on the current frame of the to-be-decoded multi-channel audio signal based on a channel pair index corresponding to the current channel pair, to obtain the audio signals of the two channels of the current channel pair of the current frame; and performing energy or amplitude de-equalization processing on the audio signals of the two channels of the current channel pair based on the energy or amplitude equalization side information of the current channel pair, to obtain decoded signals of the two channels of the current channel pair.

9. The method according to claim 8, wherein the K channel pairs comprise a current channel pair, and the energy or amplitude equalization side information of the current channel pair comprises fixed-point energy or amplitude scaling ratios and energy or amplitude scaling identifiers of the current channel pair, wherein the fixed-point energy or amplitude scaling ratio is a fixed-point value of an amplitude energy or amplitude scaling ratio coefficient, the energy or amplitude scaling ratio coefficient is obtained based on the respective energy or amplitudes of audio signals of the two channels of the current channel pair before energy or amplitude equalization and the respective energy or amplitudes of the audio signals of the two channels after energy or amplitude equalization, the energy or amplitude scaling identifier is used to identify that the respective energy or amplitudes of the audio signals of the two channels of the current channel pair after energy or amplitude equalization is one of increased or decreased relative to the respective energy or amplitudes of the audio signals before energy or amplitude equalization.

10. The method according to claim 9, wherein the current channel pair comprises a first channel and a second channel, and the energy or amplitude equalization side information of the current channel pair comprises a fixed-point energy or amplitude scaling ratio and an energy/amplitude scaling identifier of the first channel, and a fixed-point energy or amplitude scaling ratio and an energy or amplitude scaling identifier of the second channel.

11. An audio signal encoding apparatus, comprising a non-volatile, non-transitory, memory and a processor that are coupled to each other, wherein the processor executes program code stored in the memory, to perform the method comprising:

obtaining audio signals of P channels in a current frame of a multi-channel audio signal, wherein P is a positive integer greater than 1, the P channels comprise K channel pairs, each channel pair comprises two channels, K is a positive integer, and P is greater than or equal to K×2;

obtaining respective energy or amplitudes of the audio signals of the P channels;

generating energy or amplitude equalization side information of the K channel pairs based on the respective energy or amplitudes of the audio signals of the P channels including:

determining, based on respective energy or amplitudes of the audio signals of two channels of a current channel pair before energy or amplitude equalization, respective energy or amplitudes of the audio signals of the two channels of the current channel pair after energy or amplitude equalization;

generating the energy or amplitude equalization side information of the current channel pair based on the respective energy or amplitudes of the audio signals of the two channels of the current channel pair before energy or amplitude equalization and the respective energy or amplitudes of the audio signals of the two channels after energy or amplitude equalization;

wherein the K channel pairs comprise the current channel pair; and encoding the energy or amplitude equalization side information of the K channel pairs and the audio signals of the P channels to obtain an encoded bitstream.

12. The audio signal encoding apparatus according to claim 11, wherein the energy or amplitude equalization side information of the current channel pair comprises:

fixed-point energy or amplitude scaling ratios and energy or amplitude scaling identifiers of the current channel pair, wherein the fixed-point energy or amplitude scaling ratio is a fixed-point value of an energy or amplitude scaling ratio coefficient, the energy or amplitude scaling ratio coefficient is obtained based on respective energy or amplitudes of audio signals of the two channels of the current channel pair before energy or amplitude equalization and respective energy or amplitudes of the audio signals of the two channels after energy or amplitude equalization, the energy or amplitude scaling identifier is used to identify that the respective energy or amplitudes of the audio signals of the two channels of the current channel pair after energy or amplitude equalization is one of increased or decreased relative to the respective energy or amplitudes of the audio signals before energy or amplitude equalization.

13. The audio signal encoding apparatus according to claim 11, wherein the generating energy or amplitude equalization side information of the K channel pairs based on the respective energy or amplitudes of the audio signals of the P channels comprises: generating the energy or amplitude equalization side information of the current channel pair based on the respective energy or amplitudes of the audio signals of the two channels of the current channel pair before energy or amplitude equalization.

14. The audio signal encoding apparatus according to claim 11, wherein the current channel pair comprises a first channel and a second channel, and the energy or amplitude equalization side information of the current channel pair comprises:

a fixed-point energy or amplitude scaling ratio and an energy or amplitude scaling identifier of the first channel, and a fixed-point energy or amplitude scaling ratio and an energy or amplitude scaling identifier of the second channel.

15. The audio signal encoding apparatus according to claim 11, wherein the generating the energy or amplitude equalization side information of the current channel pair based on the respective energy or amplitudes of the audio signals of the two channels of the current channel pair before energy or amplitude equalization and the respective energy or amplitudes of the audio signals of the two channels after energy or amplitude equalization comprises:

determining an energy or amplitude scaling ratio coefficient of a $q^{th}$ channel of the current channel pair and an energy or amplitude scaling identifier of the $q^{th}$ channel based on energy or an amplitude of an audio signal of the $q^{th}$ channel before energy or amplitude equalization and energy or an amplitude of the audio signal of the $q^{th}$ channel after energy or amplitude equalization; and determining a fixed-point energy or amplitude scaling ratio of the $q^{th}$ channel based on the energy or amplitude scaling ratio coefficient of the $q^{th}$ channel, wherein q is one of 1 or 2.

16. The audio signal encoding apparatus according to claim 13, wherein the determining, based on the respective energy or amplitudes of the audio signals of the two channels of the current channel pair before energy or amplitude equalization, the respective energy or amplitudes of the audio signals of the two channels of the current channel pair after energy or amplitude equalization comprises:

determining an average energy or amplitude value of the audio signals of the current channel pair based on the respective energy or amplitudes of the audio signals of the two channels of the current channel pair before energy or amplitude equalization; and determining, based on the average energy or amplitude value of the audio signals of the current channel pair, the respective energy or amplitudes of the audio signals of the two channels of the current channel pair after energy or amplitude equalization.

17. An audio signal encoding apparatus, comprising a non-volatile, non-transitory, memory and a processor that are coupled to each other, wherein the processor executes program code stored in the memory, to perform the method comprising:

obtaining a to-be-decoded bitstream;

demultiplexing the to-be-decoded bitstream to obtain a current frame of a to-be-decoded multi-channel audio signal, a quantity K of channel pairs comprised in the current frame, respective channel pair indexes of the K channel pairs, and energy or amplitude equalization side information of the K channel pairs, wherein K is a positive integer, and each channel pair comprises two channels;

wherein the K channel pairs comprise a current channel pair, and the energy or amplitude equalization side information of the current channel pair is generated based on respective energy or amplitudes of the audio signals of two channels of the current channel pair before energy or amplitude equalization and respective energy or amplitudes of the audio signals of the two channels after energy or amplitude equalization:

wherein the respective energy or amplitudes of the audio signals of the two channels of the current channel pair after energy or amplitude equalization are determined based on the respective energy or amplitudes of the audio signals of the two channels of the current channel pair before energy or amplitude equalization; and decoding the current frame of the to-be-decoded multichannel audio signal based on the respective channel pair indexes of the K channel pairs and the energy or amplitude equalization side information of the K channel pairs, to obtain decoded signals of the current frame.

18. The audio signal encoding apparatus according to claim 17, wherein the energy or amplitude equalization side information of the current channel pair comprises fixed-point energy or amplitude scaling ratios and energy or amplitude scaling identifiers of the current channel pair, wherein the fixed-point energy or amplitude scaling ratio is a fixed-point value of an energy or amplitude scaling ratio coefficient, the energy or amplitude scaling ratio coefficient is obtained based on the respective energy or amplitudes of audio signals of the two channels of the current channel pair before energy or amplitude equalization and the respective energy or amplitudes of the audio signals of the two channels after energy or amplitude equalization, the energy or amplitude scaling identifier is used to identify that the respective energy or amplitudes of the audio signals of the two channels of the current channel pair after energy or amplitude equalization is one of increased or decreased relative to the respective energy or amplitudes of the audio signals before energy or amplitude equalization.

19. The audio signal encoding apparatus according to claim 13, wherein the determining, based on the respective energy or amplitudes of the audio signals of the two channels of the current channel pair before energy or amplitude equalization, the respective energy or amplitudes of the audio signals of the two channels of the current channel pair after energy or amplitude equalization comprises:

determining an average energy or amplitude value of the audio signals of the current channel pair based on the respective energy or amplitudes of the audio signals of the two channels of the current channel pair before energy or amplitude equalization; and determining, based on the average energy or amplitude value of the audio signals of the current channel pair, the respective energy or amplitudes of the audio signals of the two channels of the current channel pair after energy or amplitude equalization.

20. The audio signal encoding apparatus according to claim 11, wherein the encoding the energy or amplitude equalization side information of the K channel pairs and the audio signals of the P channels to obtain an encoded bitstream comprises:

encoding the energy or amplitude equalization side information of the K channel pairs, K, respective channel pair indexes of the K channel pairs, and the audio signals of the P channels, to obtain the encoded bitstream.

* * * * *